United States Patent
Kondo et al.

(10) Patent No.: US 7,595,920 B2
(45) Date of Patent: Sep. 29, 2009

(54) PROCESSING APPARATUS AND PROCESSING METHOD OF COLOR IMAGE INFORMATION

(75) Inventors: Masaki Kondo, Toyoake (JP); Yasunari Yoshida, Aichi-ken (JP); Takeshi Watanabe, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 416 days.

(21) Appl. No.: 11/359,537

(22) Filed: Feb. 23, 2006

(65) Prior Publication Data

US 2006/0188157 A1    Aug. 24, 2006

(30) Foreign Application Priority Data

| Feb. 23, 2005 | (JP) | ............................. 2005-046905 |
| Feb. 23, 2005 | (JP) | ............................. 2005-046906 |
| Mar. 24, 2005 | (JP) | ............................. 2005-085266 |
| Mar. 28, 2005 | (JP) | ............................. 2005-090623 |

(51) Int. Cl.
  *G03F 3/08* (2006.01)
  *G06K 9/001* (2006.01)

(52) U.S. Cl. .................. 358/518; 358/519; 358/520; 358/522; 382/167; 382/168; 382/169; 382/170; 382/171; 382/172

(58) Field of Classification Search .............. 358/1.9, 358/518, 525, 1.15, 1.16; 382/162; 348/649
See application file for complete search history.

(56) References Cited

U.S. PATENT DOCUMENTS

| 5,384,601 A |   | 1/1995 | Yamashita et al. |
| 5,689,590 A |   | 11/1997 | Shirasawa et al. |
| 6,151,136 A | * | 11/2000 | Takemoto .................. 358/1.9 |
| 6,332,038 B1 | * | 12/2001 | Funayama et al. .......... 382/190 |
| 6,587,593 B1 | * | 7/2003 | Matsuoka et al. ........... 382/260 |

(Continued)

FOREIGN PATENT DOCUMENTS

JP    296477    4/1990

(Continued)

OTHER PUBLICATIONS

Japan Patent Office, Office Action mailed Jul. 3, 2007 in Priority Application No. JP 2005-046905.

(Continued)

*Primary Examiner*—Mark K Zimmerman
*Assistant Examiner*—Haris Sabah
(74) *Attorney, Agent, or Firm*—Baker Botts L.L.P.

(57) ABSTRACT

An image processing apparatus for color image information inputs a combination of component values of reference colors that constitute a processing color, and converts the combination of component values into a lightness value, saturation value, and hue value. The first correction factor, the second correction factor, and the third correction factor each has a value of 1.0 for a lightness value, saturation value and hue value converted from a specified color respectively, and monotonically decreases toward 0.0. The modulation amount storage means stores a modulation amount of the lightness value, saturation value, and hue value respectively.

The lightness correction means computes a corrected lightness value from the converted lightness value, the saturation correction means computes a corrected saturation value from the converted saturation value, and the hue correction means computes a corrected hue value from the converted hue value by using the first, second, and third correction factors, and the modulation amount. The inverse conversion means inversely converts the corrected lightness value, corrected saturation value, and corrected hue value into a combination of component values of reference colors.

16 Claims, 15 Drawing Sheets

U.S. PATENT DOCUMENTS

| | | | |
|---|---|---|---|
| 6,975,437 B2 * | 12/2005 | Takemoto | 358/518 |
| 2001/0035989 A1 | 11/2001 | Takemoto | |
| 2003/0156196 A1 * | 8/2003 | Kato et al. | 348/207.2 |
| 2004/0114798 A1 | 6/2004 | Park et al. | |
| 2004/0126010 A1 * | 7/2004 | Yamazoe | 382/162 |
| 2004/0239814 A1 * | 12/2004 | Hirashima et al. | 348/649 |

FOREIGN PATENT DOCUMENTS

| | | |
|---|---|---|
| JP | 2000-092337 A1 | 3/2000 |
| JP | 2000217127 | 8/2000 |
| JP | 2001-186368 A1 | 7/2001 |
| JP | 2001186368 * | 7/2001 |
| JP | 2001-313838 A1 | 11/2001 |
| JP | 2002-281327 A1 | 9/2002 |
| JP | 2003-341186 A1 | 12/2003 |
| JP | 2004297438 | 10/2004 |

OTHER PUBLICATIONS

Japan Patent Office, Office Action mailed Jul. 3, 2007 in Priority Application No. JP 2005-046906.

Japan Patent Office, Office Action mailed Jul. 3, 2007 in Priority Application No. JP 2005-085266.

Japan Patent Office, Office Action mailed Jul. 3, 2007 in Priority Application No. JP 2005-090623.

\* cited by examiner (a)

(b)

(a)

(b)

(c)

(a)

(b)

(c)

PROCESSING APPARATUS AND PROCESSING METHOD OF COLOR IMAGE INFORMATION

CROSS REFERENCE TO RELATED APPLICATIONS

The present application claims priority to Japanese Patent Application No. 2005-046905, filed on Feb. 23, 2005, Japanese Patent Application No. 2005-046906, filed on Feb. 23, 2005, Japanese Patent Application No. 2005-085266, filed on Mar. 24, 2005, and Japanese Patent Application No. 2005-090623, filed on Mar. 28, 2005. The contents thereof are hereby incorporated by reference into the present application.

BACKGROUND OF THE INVENTION

1. Field of the Invention

The present invention relates to a technique for correcting color of a color image by means of processing information (color image information) that describes the color image. Specifically, the present invention relates to a technique for correcting a specified color in a concentrative manner and also for correcting other colors to correspond therewith.

2. Description of the Related Art

Since the performance of digital cameras and digital video cameras has improved and their prices have fallen, these cameras is becoming widespread. These cameras output color image information. The color image information output from these cameras is used as input into a color printer (for example, an ink jet printer) to print a color image, or as input into a color image display apparatus such as an LCD to display a color image.

The colors displayed by these printing apparatuses or display apparatuses (these will be collectively termed, "display apparatuses") include, colors that a person can easily imagine or recognize, such as skin color. It may be necessary to correct and display such colors so that the color resembles the specific color that the person has in mind more closely than the exact color of the photographed subject.

Japanese Laid-open Patent Publication No. H2-96477 presents a color modulation apparatus capable of extracting a region of a specified color such as skin color and correcting the color displayed within that region. Further, Japanese Laid-open Patent Publication No. 2000-217127 discloses a skin color amending apparatus capable of independently correcting the saturation and hue of a skin color.

BRIEF SUMMARY OF THE INVENTION

In the technique presented in Japanese Laid-open Patent Publication No. H2-96477, lightness is not taken into consideration when a region of skin color is specified. As a result, the boundary between portions of light skin color and portions of dark skin color is corrected to an unnatural color in the corrected color image. Furthermore, colors in the vicinity of the boundary between the skin color and other colors are corrected to unnatural colors. In particular, in the case of correcting a color from a photographed image of a person's face, it is difficult to perform a natural correction at the boundary between portions of the skin and the eyebrows, or at the boundary between lighter portions of the face and the darker portions thereof such as the chin or neck.

In the technique presented in Japanese Laid-open Patent Publication No. 2000-217127, the saturation and hue of the skin colors can be corrected independently. However, the problem remains that colors near the boundary between skin color and other colors are corrected to unnatural colors. Further, when the skin color is corrected, primary colors such as red or yellow are also corrected. Therefore, there is a problem in that the primary colors do not remain primary colors. Further, the problem remains that the colors to be displayed differ according to the type of printing sheet. For example, when color image information has been corrected such that natural colors are printed on a printing sheet with a large color gamut, such as glossy paper, there is a problem in that colors cannot be displayed naturally when printing is performed on a printing sheet with a small color gamut, such as normal paper, because the gradation of the colors breaks down. In the conventional technique, there is thus the problem that the color image information must be corrected for each type of printing sheet, and the correcting operation is therefore troublesome.

The present invention solves the aforementioned problem. The present invention provides a technique capable of correcting colors near the boundary between a specified color such as skin color and colors other than the specified colors, so that the corrected colors are natural. The present invention provides a technique in which primary colors are not corrected even when the specified color is corrected. The present invention provides a technique capable of printing appropriate colors even if the type of printing sheet changes. The present invention is capable of realizing an image processing apparatus, an image processing method, and a program product for image processing.

A processing apparatus for color image information of the present invention comprises an input means, a conversion means, a first correction factor storage means, a second correction factor storage means, a third correction factor storage means, a modulation amount storage means, a lightness correction means, a saturation correction means, a hue correction means, and an inverse conversion means.

The input means is for inputting a combination of component values of reference colors that constitute a processing color.

The conversion means is for converting the inputted combination of component values of reference colors into a lightness value, saturation value, and hue value.

The first correction factor is a factor dependent on a lightness value, wherein the first correction factor has a value of 1.0 for a lightness value converted from a specified color, and monotonically decreases toward 0.0: as the lightness value deviates from the lightness value converted from the specified color.

The second correction factor is a factor dependent on a saturation value, wherein the second correction factor has a value of 1.0 for a saturation value converted from the specified color, and monotonically decreases toward 0.0 as the saturation value deviates from the saturation value converted from the specified color.

The third correction factor is a factor dependent on a hue value, wherein the third correction factor has a value of 1.0 for a hue value converted from the specified color, and monotonically decreases toward 0.0 as the hue value deviates from the hue value converted from the specified color.

The modulation amount storage means can store a modulation amount of a lightness value, modulation amount of a saturation value, and modulation amount of a hue value.

The lightness correction means computes a corrected lightness value of the processing color by adding a multiplied value to the converted lightness value of the processing color prior to correction, wherein the multiplied value is a product of "the modulation amount of a lightness value," "the first correction factor corresponding to the converted lightness value of the processing color prior to correction," "the second correction factor corresponding to the converted saturation value of the processing color prior to correction," and "the third correction factor corresponding to the converted hue value of the processing color prior to correction." A fourth correction factor and/or a fifth correction factor (to be described) may also be multiplied as required.

The saturation correction means computes a corrected saturation value of the processing color by adding a multiplied value to the converted saturation value of the processing color prior to correction, wherein the multiplied value is a product of "the modulation amount of a saturation value," "the first correction factor corresponding to the converted lightness value of the processing color prior to correction," "the second correction factor corresponding to the converted saturation value of the processing color prior to correction," and "the third correction factor corresponding to the converted hue value of the processing color prior to correction." The fourth correction factor and/or the fifth correction factor (to be described) may also be multiplied as required.

The hue correction means computes a corrected hue value of the processing color by adding a multiplied value to the converted hue value of the processing color prior to correction, wherein the multiplied value is a product of "the modulation amount of a hue value," "the first correction factor corresponding to the converted lightness value of the processing color prior to correction," "the second correction factor corresponding to the converted saturation value of the processing color prior to correction," and "the third correction factor corresponding to the converted hue value of the processing color prior to correction." The fourth correction factor and/or the fifth correction factor (to be described) may also be multiplied as required.

The inverse conversion means inversely converts the corrected lightness value, corrected saturation value, and corrected hue value into a combination of component values of reference colors constituting the corrected processing color.

Above, 1.0 and 0.0 are standardized values of the correction factors, wherein 1.0 represents a maximum value and 0.0 represents a minimum value. That is, when the actual maximum value of the correction factor has been converted into 1.0, and the actual minimum value has been converted into 0.0, the following definitions are fulfilled if the correction factor of the specified color is 1.0, "the converted lightness value of the specified color is 1.0," "the converted saturation value of the specified color is 1.0," and "the converted hue value of the specified color is 1.0".

With this processing apparatus, the processing color can be converted into lightness, saturation, and hue values. Consequently, the lightness value, the saturation value, and the hue value of the specified color can be corrected independently.

Further, the first to third correction factors are set such that the specified color has a value of 1.0 and the value monotonically decreases toward 0.0 as the value deviates from the specified color. Consequently, not only can the specified color be corrected, but colors other than the specified color can also be corrected. It is possible to correct the colors to be natural at the boundary between the specified color and the colors other than the specified color.

The modulation amount can be set freely, and can perform both large corrections and small corrections. The modulation amount may be preset, or may be set at the time of correction operation.

The present invention also presents a processing method of color image information. The processing method of color image information of the present invention comprises: an input step for inputting a combination of component values of reference colors that constitute a processing color, a conversion step for converting the inputted combination of component values of reference colors into a lightness value, saturation value, and hue value, a modulation amount storing step for storing a modulation amount of a lightness value, modulation amount of a saturation value, and modulation amount of a hue value, a lightness correction step, a saturation correction step, a hue correction step, and an inverse conversion step for inversely converting the corrected lightness value, corrected saturation value, and corrected hue value into a combination of component values of reference colors that constitute the corrected color.

In the lightness correction step, the corrected lightness value of the processing color is computed by adding a multiplied value to the converted lightness value of the processing color prior to correction, wherein the multiplied value is a product of "the modulation amount of a lightness value," "the first correction factor corresponding to the converted lightness value of the processing color prior to correction," "the second correction factor corresponding to the converted saturation value of the processing color prior to correction," and "the third correction factor corresponding to the converted hue value of the processing color prior to correction."

In the saturation correction step, the corrected saturation value of the processing color is computed by adding a multiplied value to the converted saturation value of the processing color prior to correction, wherein the multiplied value is a product of "the modulation amount of a saturation value," "the first correction factor corresponding to the converted lightness value of the processing color prior to correction," "the second correction factor corresponding to the converted saturation value of the processing color prior to correction," and "the third correction factor corresponding to the converted hue value of the processing color prior to correction."

In the hue correction step, the corrected hue value of the processing color is computed by adding a multiplied value to the converted hue value of the processing color prior to correction, wherein the multiplied value is a product of "the modulation amount of a hue value," "the first correction factor corresponding to the converted lightness value of the processing color prior to correction," "the second correction factor corresponding to the converted saturation value of the processing color prior to correction," and "the third correction factor corresponding to the converted hue value of the processing color prior to correction."

The first correction factor utilized in the present method has a value of 1.0 for a lightness value converted from a specified color, and monotonically decreases toward 0.0 as the lightness value deviates from the lightness value converted from the specified color.

The second correction factor utilized in the present method has a value of 1.0 for a saturation value converted from the specified color, and monotonically decreases toward 0.0 as the saturation value deviates from the saturation value converted from the specified color.

The third correction factor utilized in the present method has a value of 1.0 for a hue value converted from the specified color, and monotonically decreases toward 0.0 as the hue value deviates from the hue value converted from the specified color.

With this processing method, the processing color can be converted into lightness, saturation, and hue values. Consequently, the lightness value, the saturation value, and the hue value of the processing color can be corrected independently.

Further, the first to third correction factors are set such that the specified color has a value of 1.0 and the value monotonically decreases toward 0.0 as the value deviates from the specified color. Consequently, not only can the specified color be corrected, but colors other than the specified color can also be corrected. It is possible to correct the colors to natural colors at the boundary between the specified color and the colors other than the specified color.

The modulation amount can be set freely, and can perform both large corrections and small corrections. The modulation amount may be preset, or may be set at the time of a correction operation.

The present invention also presents a program product for processing color image information. The program product stores first correction factor data for storing a first correction factor dependent on a lightness value, wherein the first correction factor has a value of 1.0 for a lightness value converted from a specified color, and monotonically decreases toward 0.0 as the lightness value deviates from the lightness value converted from the specified color, second correction factor data for storing a second correction factor dependent on a saturation value, wherein the second correction factor has a value of 1.0 for a saturation value converted from the specified color, and monotonically decreases toward 0.0 as the saturation value deviates from the saturation value converted from the specified color, and third correction factor data for storing a third correction factor dependent on a hue value, wherein the third correction factor has a value of 1.0 for a hue value converted from the specified color, and monotonically decreases toward 0.0 as the hue value deviates from the hue value converted from the specified color.

Furthermore, the program product of the present invention stores commands for making a computer execute the following processes: an input process for inputting a combination of component values of reference colors that constitute a processing color, a conversion process for converting the inputted combination of component values of reference colors into a lightness value, saturation value, and hue value, a modulation amount storing process for storing a modulation amount of a lightness value, modulation amount of a saturation value, and modulation amount of a hue value, a lightness correction process, a saturation correction process, a hue correction process, and an inverse conversion step for inversely converting the corrected lightness value, the corrected saturation value, and the corrected hue value into a combination of component values of reference colors that constitute the corrected color.

The lightness correction process computes the corrected lightness value of the processing color by adding a multiplied value to the converted lightness value of the processing color prior to correction, wherein the multiplied value is a product of "the modulation amount of a lightness value," "the first correction factor corresponding to the converted lightness value of the processing color prior to correction," "the second correction factor corresponding to the converted saturation value of the processing color prior to correction," and "the third correction factor corresponding to the converted hue value of the processing color prior to correction."

The saturation correction process computes the corrected saturation value of the processing color by adding a multiplied value to the converted saturation value of the processing color prior to correction, wherein the multiplied value is a product of "the modulation amount of a saturation value," "the first correction factor corresponding to the converted lightness value of the processing color prior to correction," "the second correction factor corresponding to the converted saturation value of the processing color prior to correction," and "the third correction factor corresponding to the converted hue value of the processing color prior to correction."

The hue correction process computes the corrected saturation value of the processing color by adding a multiplied value to the converted hue value of the processing color prior to correction, wherein the multiplied value is a product of "the modulation amount of a hue value," "the first correction factor corresponding to the converted lightness value of the processing color prior to correction," "the second correction factor corresponding to the converted saturation value of the processing color prior to correction," and "the third correction factor corresponding to the converted hue value of the processing color prior to correction."

With this program product, the processing color can be converted into lightness, saturation, and hue values. Consequently, the lightness value, the saturation value, and the hue value of the specified color can be corrected independently.

Further, the first to third correction factors are set such that the specified color has a value of 1.0 and the value monotonically decreases toward 0.0 as the value deviates from the specified color. Consequently, not only can the specified color be corrected, but colors other than the specified color can also be corrected. It is possible to correct the colors to natural colors at the boundary between the specified color and the colors other than the specified color.

BRIEF DESCRIPTION OF THE DRAWINGS

FIG. 3(a) shows a first correction factor which depends on lightness (L*). FIG. 3(b) shows a second correction factor which depends on saturation (c*).

FIG. 3(c) shows a third correction factor which depends on hue (h*).

FIG. 7(a) shows an image of an adult face, FIG. 7(b) shows an image in which regions containing a large amount of the specified color have been extracted from the image of FIG. 7(a), FIG. 7(c) shows an image of a child, FIG. 7(d) shows an image in which regions containing a large amount of the specified color have been extracted from the image of FIG. 7(c).

FIG. 9(a) shows a lightness (L*) histogram, FIG. 9(b) shows a saturation (c*) histogram, FIG. 9(c) shows a hue (h*) histogram.

DETAILED DESCRIPTION OF THE INVENTION

Figure 1:
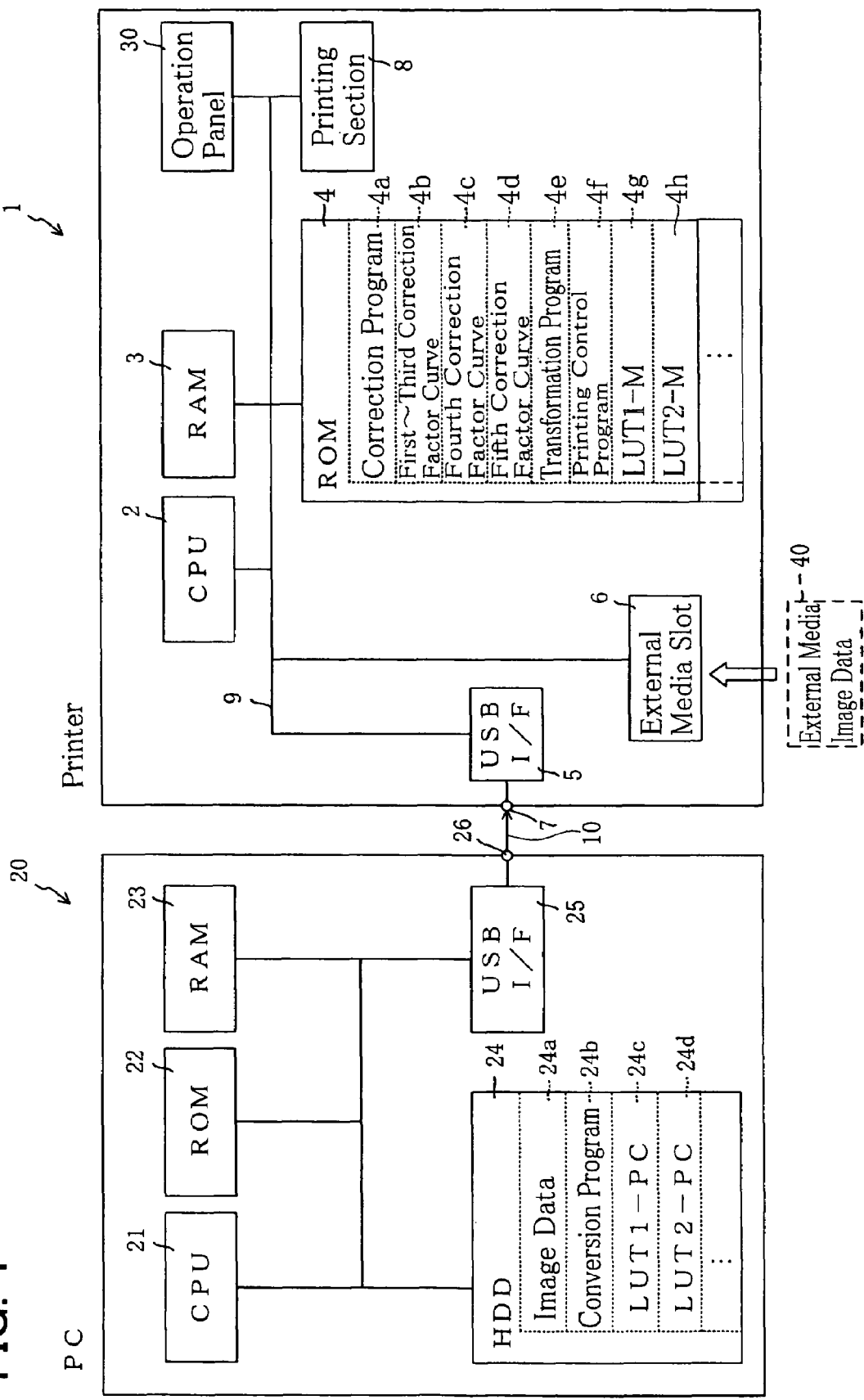
FIG. 1 shows electrical configuration of a printer and a personal computer of a representative embodiment of the present teachings.

It is preferred that the specified color is skin color.

With this processing apparatus, a skin color can be displayed after being corrected to a skin color that best represents the color that the person has in mind. At this juncture, both the skin color and colors other than the skin color are corrected, and consequently changes in the color of the boundary between the two are natural.

It is preferred that the color image to be processed is a color photograph of a face of a person, or faces of people.

With this processing apparatus, it is possible to display a color photograph of a face of a person or of faces of people with natural colors.

It is preferred that the first correction factor has a value greater than 0.0 for a maximum lightness value.

With this processing apparatus, it is possible to correct colors even in a region with a high degree of lightness.

It is preferred that the first correction factor is 1.0 within a predetermined range which includes the lightness value converted from the specified color, and monotonically decreases along a sine or cosine wave outside the predetermined range.

It is preferred that the second correction factor is 1.0 within a predetermined range which includes the saturation value converted from the specified color, and monotonically decreases along a sine or cosine wave outside the predetermined range.

It is preferred that the third correction factor is 1.0 within a predetermined range which includes the hue value converted from the specified color, and monotonically decreases along a sine or cosine wave outside the predetermined range.

With this processing apparatus, the correction factors for correcting the specified color and the correction factors for correcting the colors other than the specified color continually change, and it is possible to correct the colors to be natural at the boundary between the specified color and the colors other than the specified color.

It is preferred that the input means inputs the combination of component values of reference colors that constitute a color of each pixel constituting a predetermined area of the color image.

It is preferred that the processing apparatus of the present invention comprises a lightness histogram creation means for computing pixel counts for different lightness levels from a plurality of pixels that constitute the predetermined area, and a first correction factor curve computing means for approximating the lightness histogram under the condition that the maximum value is 1.0 and the minimum value is 0.0.

Further, it is preferred that the processing apparatus of the present invention comprises a saturation histogram creation means for computing pixel counts for different saturation levels from the plurality of pixels that constitute the predetermined area, and a second correction factor curve computing means for approximating the saturation histogram under the condition that the maximum value is 1.0 and the minimum value is 0.0.

Further, it is preferred that the processing apparatus of the present invention comprises a hue histogram creation means for computing pixel counts for different hue levels from the plurality of pixels that constitute the predetermined area, and a third correction factor curve computing means for approximating the hue histogram under the condition that the maximum value is 1.0 and the minimum value is 0.0.

In the above cases, it is preferred that the storage means for storing the first correction factor stores values on the curve computed by the first correction factor curve computing means, the storage means for storing the second correction factor stores values on the curve computed by the second correction factor curve computing means, and the storage means for storing the third correction factor stores values on the curve computed by the third correction factor curve computing means.

With this processing apparatus, the lightness histogram, the saturation histogram, and the hue histogram are created for a predetermined area of the color image. As a result, the color with the maximum frequency can be used as the specified color, and the maximum values for the specified color, namely the first correction factor, the second correction factor, and the third correction factor, can be obtained. As a result, correction corresponding to the type of actual color image can be performed efficiently.

It is preferred that the first correction factor curve computing means approximates the lightness histogram using a Gaussian function with a maximum value of 1.0 and a minimum value of 0.0, the second correction factor curve computing means approximates the saturation histogram using a Gaussian function with a maximum value of 1.0 and a minimum value of 0.0, and the third correction factor curve computing means approximates the hue histogram using a Gaussian function with a maximum value of 1.0 and a minimum value of 0.0.

With this processing apparatus, the lightness histogram, the saturation histogram, and the hue histogram are all approximated using a Gaussian function. The histograms that are created for a predetermined area of the color image can be effectively approximated with a Gaussian function. As a result, it is possible to correct the predetermined area of the color image more appropriately.

It is preferred that the processing apparatus comprises a storage means for storing a fourth correction factor wherein the fourth correction factor has a value of 1.0 for each hue within a range spanning from a minimum saturation value for the given hue to a saturation value determined from the given hue, and monotonically decreases from the determined saturation value toward a maximum saturation value for the given hue, and a fourth correction factor acquisition means for reading the fourth correction factor from the storage means for storing the fourth correction factor based on the hue value and saturation value prior to correction of the processing color.

In this case, it is preferred that the lightness correction means, the saturation correction means, and the hue correction means compute a correction amount by also multiplying "the fourth correction factor which has been read out." That is, it is preferred that the correction amount for the lightness value, the correction amount for the saturation value, and the correction amount for the hue value are each calculated by multiplying the first correction factor, the second correction factor, the third correction factor, and the fourth correction factor.

With this processing apparatus, the change in color at the boundary between the specified color and the colors other than the specified color can be made gradual. As a result, if the specified color is corrected, the change in color is natural. Furthermore, correction of primary colors with a high saturation value can be prevented. Consequently, it is possible to correct the specified color of the color image while preventing the primary colors from being corrected to non-primary colors.

It is preferred that the fourth correction factor from the predetermined saturation value to the maximum saturation value is along a sine curve.

With this processing apparatus, a curve is formed that changes smoothly along the region of the fourth correction factor between 1.0 and 0.0. In the case where the specified color of the color image is corrected, the boundary portion between the specified color and the primary color changes color naturally.

It is preferred that the processing apparatus comprises a display means capable of displaying colors composed by combining component values of reference colors inversely converted by the inverse conversion means.

With this processing apparatus, the user can verify the color image after the specified color has been corrected. The user can verify whether the specified color of the color image has been corrected to the extent desired.

The processing apparatus comprises a printing means capable of printing colors composed by combining component values of reference colors inversely converted by the inverse conversion means.

With this processing apparatus, the user can verify the state of the color image printed on the printing sheet after the specified color of the color image has been corrected. It is possible to determine whether the correction amount of the specified color has been performed to the extent desired according to the type of printing sheet.

It is preferred that the processing apparatus provided with the printing means further comprises a fifth correction factor storage means for storing a fifth correction factor which is determined for each type of printing sheet.

In this case, it is preferred that the lightness correction means, the saturation correction means and the hue correction means compute the correction amount by also multiplying "the fifth correction factor." That is, it is preferred that the correction amount for the lightness value, the correction amount for the saturation value, and the correction amount for the hue value are each calculated by multiplying the modulation amount, the first correction factor, the second correction factor, the third correction factor, and the fifth correction factor.

With this processing apparatus, in the case where the user corrects the specified color of the color image and prints the corrected color image on the printing sheet, the correction amount can be made to correspond to that particular type of printing sheet. It is possible, merely by selecting the type of printing sheet, to correct the color information in accordance with the selected printing sheet.

It is preferred that the fifth correction factor is a ratio between a volume of a color space of a color gamut printable on a standard type printing sheet and a volume of a color space of a color gamut printable on the corresponding type of printing sheet.

With this processing apparatus, the volume of the color space printable on the standard type printing sheet and the volume of the color space printable on the selected printing sheet is stored in advance in the processing apparatus, thus allowing the fifth correction factor which corresponds to the selected printing sheet to be obtained using a simple method.

The processing apparatus may provide both the fourth correction factor storage means and the fifth correction factor storage means.

In this case, it is preferred that the lightness correction means, the saturation correction means and the hue correction means compute the correction amount by also multiplying "the fourth correction factor" and "the fifth correction factor." That is, it is preferred that the correction amount for the lightness value, the correction amount for the saturation value, and the correction amount for the hue value are each calculated by multiplying the modulation amount, the first correction factor, the second correction factor, the third correction factor, the fourth correction factor, and the fifth correction factor.

With this processing apparatus, the region where the specified color and the colors other than the specified color adjoin can be made to change color gradually. As a result, if the specified color is corrected, there is a natural change in color. Furthermore, it is possible to prevent the correction of primary colors with a high saturation value. Further, it is possible to have a correction amount that corresponds to the type of printing sheet. It is possible, merely by selecting the type of printing sheet, to obtain a correction amount that corresponds to the selected printing sheet.

A first embodiment of the present invention will be described with reference to figures. FIG. 1 shows the electrical configuration of a printer 1 and a personal computer 20 (hereafter termed "PC 20") connected with the printer 1. The printer 1 inputs color image information from the PC 20, corrects the input color image information, converts the corrected color image information into printing information, and prints a color image describing the corrected color image information. The color image information can also be input to the printer 1 from external media 40 mounted on an external media slot 6 of the printer 1.

The printer 1 provides a CPU 2, a RAM 3, a ROM 4, a USB interface 5, a USB connector terminal 7, the external media slot 6, an operation panel 30, and a printing section 8. These are connected with one another by a bus 9.

The CPU 2 is a microprocessor that executes various programs stored in the ROM 4. The RAM 3 is a memory having a work area that temporarily stores variables and the like when the CPU 2 executes the various programs. The ROM 4 is a read only memory that stores the various programs to be executed by CPU2 and constants or tables used as reference for such programs executed by the CPU 2.

Stored in the ROM4 are correction program 4a, first to third correction factor curves 4b, a fourth correction factor curve 4c, a fifth correction factor curve 4d, a transformation program 4e, a printing control program 4f, look-up tables LUT1-M (4g) and LUT2-M (4h), etc.

The correction program 4a corrects a lightness value, a saturation value, and a hue value of a color described in color image information input to the printer. Below, the color to be corrected will be termed as "processing color."

The lightness value of the processing color is corrected by adding a multiplied value to the converted lightness value of the processing color prior to correction, wherein the multiplied value is a product of "the modulation amount of the lightness value," "the first correction factor corresponding to the converted lightness value of the processing color prior to correction," "the second correction factor corresponding to the converted saturation value of the processing color prior to correction," and "the third correction factor corresponding to the converted hue value of the processing color prior to correction."

The saturation value of the processing color is corrected by adding to a multiplied value to the converted saturation value of the processing color prior to correction, wherein the multiplied value is a product of "the modulation amount of the saturation value," "the first correction factor corresponding to the converted lightness value of the processing color prior to correction," "the second correction factor corresponding to the converted saturation value of the processing color prior to correction," and "the third correction factor corresponding to the converted hue value of the processing color prior to correction."

The hue value of the processing color is corrected by adding to a multiplied value to the converted hue value of the processing color prior to correction, wherein the multiplied value is a product of "the modulation amount of the hue value," "the first correction factor corresponding to the converted lightness value of the processing color prior to correction," "the second correction factor corresponding to the converted saturation value of the processing color prior to correction," and "the third correction factor corresponding to the converted hue value of the processing color prior to correction."

"The modulation amount of the lightness value," "the modulation amount of the saturation value," and "the modulation amount of the hue value" are set by a user or the like. A large modulation amount is set when the user wishes to correct the color by a large amount, and a small modulation amount is set when the user wishes to correct the color by a small amount. The modulation amount can be set independently for the lightness value, the saturation value, and the hue value. The user can, for example, set the amount so that the lightness value is corrected by a large amount and the saturation value is corrected by a small amount. "The modulation amount of the lightness value," "the modulation amount of the saturation value," and "the modulation amount of the hue value" set by the user or the like is stored in the RAM 3. "The modulation amount of the lightness value," "the modulation amount of the saturation value," and "the modulation amount of the hue value" stored in the RAM 3 are referred to when the correction program 4a is executed.

The first to third correction factor curves 4b are a curve representing the first correction factor which depends on the lightness value, a curve representing the second correction factor which depends on the saturation value, and a curve representing the third correction factor which depends on the hue value, and these are referred to when the correction program 4a is executed. The curve representing the first correction factor, the curve representing the second correction factor, and the curve representing the third correction factor may be represented as a transformation table in which a graph is turned into numerical values and stored, or may be represented as a formula describing the curves.

The fourth correction factor curve 4c is a correction factor to prevent primary colors from being corrected by a large amount, and monotonically decreases towards the maximum saturation in the hue provided (equivalent to the primary colors). The fourth correction factor curve 4c is referred to when the correction program 4a is executed. The fourth correction factor curve 4c may be represented as a transformation table in which a graph is turned into numerical values and stored, or may be represented as a formula describing the curve.

The fifth correction factor curve stores a correction factor of each type of printing sheet that can be printed by the printer 1. When the printer 1 performs printing, the fifth correction factor curve corrects the effects of having different maximum values of a printable color gamut according to the type of printing sheet.

The printing sheets that can be printed by the printer 1 include normal paper, coated paper for an ink jet, photographic glossy paper, and the like.

The transformation program 4e transforms a combination of component values of reference colors R (red), G (green), B (blue) that describe the corrected processing colors (hereafter termed "RGB values") into a combination of component values C (cyan), M (magenta), Y (yellow), and K (black) (hereafter termed "CMYK values"), which are the ink colors used in printing. A look-up table is used in this transformation program.

The printing program 4f, in accordance with the CMYK values that were transformed by the transformation program 4e, controls a driving apparatus and the like for driving a carriage mounted on a print head of the printing section 8 or for driving a printing sheet.

The look-up table LUT1-M (4g) has the RGB values input thereto and performs ICC sRGB profile conversion.

The look-up table LUT2-M (4h) has the RGB values input thereto and transforms these into the CMYK values that comprise the printing information. A plurality of look-up tables is stored to correspond to the ink utilized in printing, the type of printing sheet, the printing resolution, etc.

The USB interface 5 communicates with the PC 20 via a USB cable 10 connected with the USB terminal 7. The USB interface 5 can input the RGB values that constitute the corrected color image information from the PC 20, and can input the CMYK values that comprise the combination of component values of the ink for the printer to execute printing.

The external media 40 can store color image information taken by a digital camera or the like. The RGB values that constitute the color image information from the external media 40 are input to the printer 1 by means of mounting the external media 40 on the external media slot 6.

Figure 2:
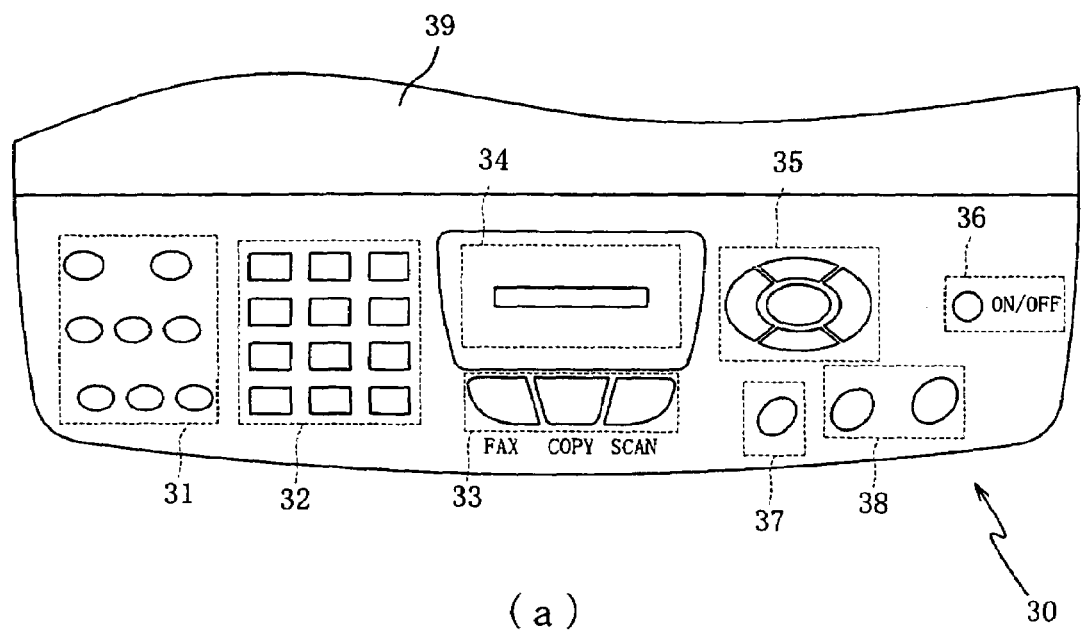
FIG. 2(a) shows a plan view of a panel portion of an outer view of the printer.
FIG. 2(b) shows a front view of the panel portion.
Figure 2:
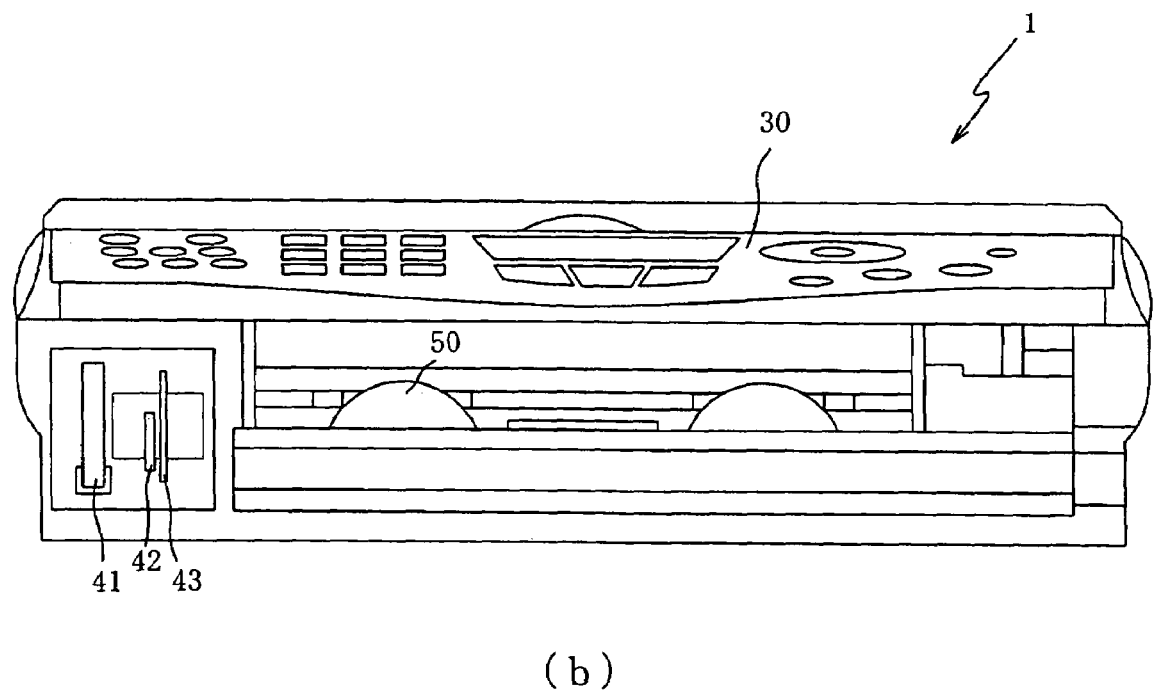

The printing section 8 provides components not shown in the figures such as a carriage, ink jet heads, and ink tanks for each of the ink colors C (cyan), M (magenta), Y (yellow), and K (black). The carriage moves above a sheet member that performs printing. The ink jet heads are mounted on the carriage, and discharge ink supplied from the ink tanks to a predetermined position on the sheet member. The operation panel 30 is a section for the user to perform the settings of the printer 1, and will be described below with reference to FIG. 2.

The PC 20 comprises a CPU 21, a ROM 22, a RAM 23, a hard disc 24, a USB interface 25, etc. The CPU 21 is a microprocessor that executes various programs stored in the ROM 22 and the hard disc 24. The RAM 23 is a memory having a work area that temporarily stores variables and the like when the CPU 21 executes the various programs.

The hard disc 24 is a nonvolatile memory with a large memory capacity. The hard disc 24 stores the OS, image data 24a taken by the digital camera or the like, a color conversion program 24b, a look-up table 24c, a look-up table 24d, etc.

The color image information 24a is input from the digital camera via the USB interface 25. The inputted image data 24a is stored on the hard disc 24. The color conversion program 24b is a printer driver program. The color conversion program 24b converts the RGB values that comprise the color image information 24a into the CMYK values in order to print the color image stored in the color image information 24a. The conversion from the color image information 24a to the CMYK values is performed by referring to the look-up table 24c and the look-up table 24d.

The look-up table 24c and the look-up table 24d convert the three-dimensional data that represents the RGB values into four-dimensional data that represents the CMYK values.

The color conversion program 24b, the look-up table 24c, and the look-up table 24d perform processes that correspond to the type of printer 1 used. Corresponding with the type of printer 1 can be made possible by reading data, supplied from a CD-ROM or the like that accompanies the printer 1, from a CD-ROM drive (not shown) and then storing the data in the hard disc 24. Further, a communication interface (not shown) may be attached, and the data in the color conversion program 24b, the look-up table 24c, and the look-up table 24d may be received via a network such as the internet.

The USB interface 25 is an interface that performs communication with an external device via a USB cable connected with a USB terminal 26. With the USB interface 25, it becomes possible to, for example, input the image information taken with the digital camera, output via the USB cable 10 the printing information for the printer 1 to perform printing, and receive image information read in from a scanner that the printer 1 provides.

FIG. 2(a) shows a top view of a portion of the operation panel 30. FIG. 2(b) shows a front view of a portion of the operation panel 30. The printer 1 is a multi-functional product that can perform faxing, copying, and scanning. The faxing, copying, and scanning functions can be selected with a switch 33. When image information has been received from the PC 20, printing can be performed even if one of the faxing, copying, or scanning functions has been selected.

A setting switch 31 can set conditions for when faxing, copying, or scanning are to be performed. A dial button 32 is used, for example, to input fax numbers when a fax is to be transmitted. A display 34 is composed of liquid crystal, and can display the setting states of faxing, copying, and scanning, and can select a desired function from among the plurality of functions displayed on the liquid crystal.

When a cursor is displayed in the display 34, a cursor key 35 can be used to move this cursor. The cursor key 35 can be used for selecting the desired function from among the plurality of functions displayed in the display 34.

When the user is to perform color correction of the specified color, the user operates the cursor key 35 so that a screen for correcting the specified color is displayed on the screen of the display 34. The user selects the specified color to be modulated on the display 34, sets the lightness value modulation amount, the saturation value modulation amount, and the hue value modulation amount, then instructs the execution of the color correction.

Further, in a case where the user selects the type of printing sheet placed in a paper supply apparatus (not shown), a screen for selecting the type of printing sheet is displayed on the display 34, and the user can operate the cursor key 35 to select the type of printing sheet.

A stop button 37 can be used to instruct a halt when faxing, copying, or scanning is being performed. When faxing, copying, or scanning is to be performed, a start button 38 can be used to instruct the particular function to be started. A flat-bed 39 is a plane on which to place materials when faxing, copying, or scanning is to be performed, and is used when the image information of the material is to be read.

On a front face of the printer 1 a discharge tray 50 is provided to which a printing sheet with the printed image information is discharged. A plurality of external media slots on which external media are mounted is formed next to the discharge tray 50. In FIG. 2(b), the following are provided: a slot 41 on which a Compact Flash (registered trademark) is mounted, a slot 42 on which a Memory Stick (registered trademark) is mounted, and a slot 43 on which a Smart Media (registered trademark) is mounted.

The concept of the method for correcting the specified color according to the present invention will be described for a case where the specified color is skin color. In the present embodiment, colors other than the specified color are also corrected when the specified color is corrected. The color for which the correcting operation is performed will be termed as "processing color." The processing color may be either the specified color or may be a color other than the specified color.

Below, the correction process of the color is described generally. The color to be processed is described in the color image information as a combination of component values (RGB values) of reference colors that constitute the processing color. In the present embodiment, the RGB values (the combination of the component values of the reference colors that constitute the processing color) are converted into a lightness value, a saturation value, and a hue value.

Next, the first correction factor corresponding to the converted lightness value of the processing color prior to correction, the second correction factor corresponding to the converted saturation value of the processing color prior to correction, and the third correction factor corresponding to the converted hue value of the processing color prior to correction are determined.

Then, the lightness value is corrected. Here, the lightness value is corrected by adding a multiplied value to the converted lightness value of the processing color prior to correction, wherein the multiplied value is a product of the configured lightness modulation amount, the first correction factor corresponding to the converted lightness value of the processing color prior to correction, the second correction factor corresponding to the converted saturation value of the processing color prior to correction, and the third correction factor corresponding to the converted hue value of the processing color prior to correction.

Then, the saturation value is corrected. Here, the saturation value is corrected by adding a multiplied value to the converted saturation value of the processing color prior to correction, wherein the multiplied value is a product of the configured saturation modulation amount, the first correction factor corresponding to the converted lightness value of the processing color prior to correction, the second correction factor corresponding to the converted saturation value of the processing color prior to correction, and the third correction factor corresponding to the converted hue value of the processing color prior to correction.

Then, the hue value is corrected. Here, the hue value is corrected by adding a multiplied value to the converted hue value of the processing color prior to correction, wherein the multiplied value is a product of the configured hue modulation amount, the first correction factor corresponding to the converted lightness value of the processing color prior to correction, the second correction factor corresponding to the converted saturation value of the processing color prior to correction, and the third correction factor corresponding to the converted hue value of the processing color prior to correction.

The lightness value modulation amount, the saturation value modulation amount, and the hue value modulation amount can be set by the user, such that the user can change the correction conditions of the processing color.

Figure 3:
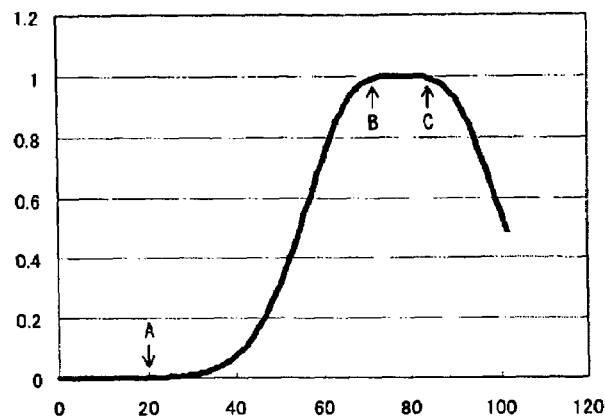
FIG. 3 shows various correction factors.
Figure 3:
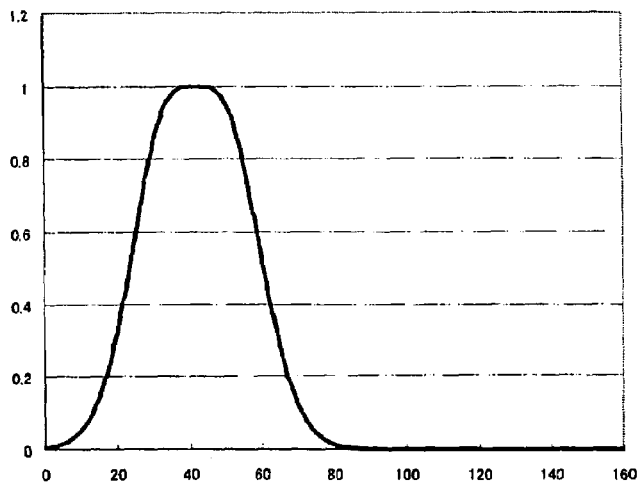
Figure 3:
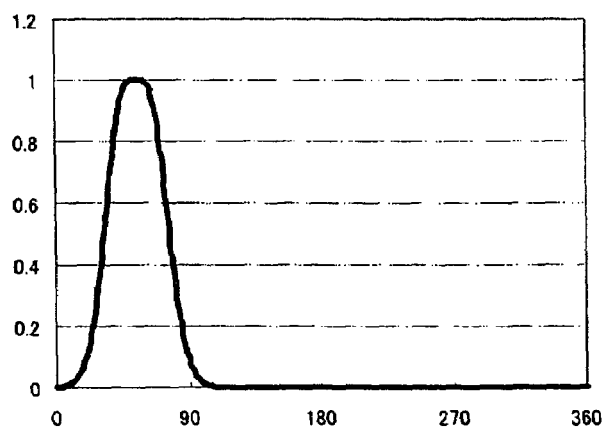

FIG. 3(a) is a curve showing the relationship between the lightness value and the first correction factor. The lightness value is shown on the horizontal axis, and the first correction factor is shown on the vertical axis. The first correction factor has been standardized, and has values of 0.0~1.0. Where the lightness value is in the range shown from 0 to A, the value of the first correction factor is 0.0. Where the lightness value is in the range shown from B to C, the value of the first correction factor is 1.0. Where the lightness value is in the range shown from A to B, there is a smooth S-shaped monotonically increasing curve, and when the lightness value is in the range past C, there is a smooth inverse S-shaped monotonically decreasing curve. Even at the maximum lightness value of 100, the value of the first correction factor is set to be a predetermined value greater than 0.0. The lightness value of the specified color has a first correction factor of 1.0 (the maximum value) in the range shown from B to C.

In a range where the lightness value is high, the first correction factor is set to be greater than a certain extent. Color is changed by an extent that corresponds to the modulation amount of the lightness value. When printing is performed, the amount of ink used is small when there is a high lightness value. Consequently, if the modulation amount of the lightness value is small, it is possible for that modulation amount to be ignored. Since the first correction factor has been set to be greater than a certain extent, a satisfactory correction can be performed even if the lightness value is high.

The range shown from B to C represents a lightness range corresponding to the skin color (the specified color). The range outside of the range from B to C shows a lightness range corresponding to colors other than the skin color. That is, the first correction factor is set to a value of 1.0 for the lightness value of the skin color, the specified color. For the colors other than the skin color, the value of the first correction factor monotonically decreases toward 0.0 as the lightness value deviates from the lightness value of the skin color. It is preferred that the monotonically decreasing function is a function that changes gradually, and a sine or a cosine function can be used.

When utilizing a sine function, the relationship between the first correction factor and a lightness level can be expressed as $Y=\sin(a \times L^*)/2+0.5$. "Y" represents the first correction factor, "a" represents a constant, and "$L^*$" represents the lightness value.

With respect to FIG. 3(a), the position shown by "A" and the position shown by "B" may be joined by a straight line. In that case, the slope of the straight line may be set to that degree. Further, the function in which change is gradual may use a Gaussian function or a tertiary polynomial or a greater polynomial. Further, a mathematical expression need not be utilized, and a look-up table formed from an arbitrarily drawn curve may be utilized instead.

FIG. 3(b) is a curve showing the relationship between the second correction factor and the saturation value. The saturation value is shown from 0 to 160. The second correction factor has been set to a value of 1.0 (maximum value) in the range containing the saturation value of the skin color which is the specified color. For the saturation value of the colors other than the skin color, the second correction factor monotonically decreases toward 0.0 as the saturation value deviates from the saturation value of the skin color. The monotonically decreasing function is the same as the first correction factor, and therefore a description thereof is omitted.

FIG. 3(c) is a curve showing the relationship between the third correction factor and the hue value. The hue value is shown from 0 to 360. The third correction factor has been set to a value of 1.0 (maximum value) in the range containing the hue value of the skin color which is the specified color. Further, for the hue value of the colors other than the skin color, the third correction factor monotonically decreases toward 0.0 as the hue value deviates from the hue value of the skin color. The monotonically decreasing function is the same as the first correction factor, and therefore a description thereof is omitted.

If the lightness value prior to correction is $L^*$, and the corrected lightness value is $L^{*\prime}$, then:

$$L^{*\prime}=L^*+\Delta L^* \times F(L^*) \times F(c^*) \times F(h^*) \qquad \text{Formula 1.}$$

$\Delta L^*$ represents the lightness value modulation amount to be set by the user or the like, $F(L^*)$ represents the first correction factor, $F(c^*)$ represents the second correction factor, and $F(h^*)$ represents the third correction factor.

If the saturation value prior to correction is $c^*$, and the corrected saturation value is $c^{*\prime}$, then:

$$c^{*\prime}=c^*+\Delta c^* \times F(L^*) \times F(c^*) \times F(h^*) \qquad \text{Formula 2.}$$

$\Delta c^*$ represents the saturation value modulation amount to be set by the user or the like, $F(L^*)$ represents the first correction factor, $F(c^*)$ represents the second correction factor, and $F(h^*)$ represents the third correction factor.

If the hue value prior to correction is $h^*$, and the corrected hue value is $h^{*\prime}$, then:

$$h^{*\prime}=h^*+\Delta h^* \times F(L^*) \times F(c^*) \times F(h^*) \qquad \text{Formula 3.}$$

$\Delta h^*$ represents the hue value modulation amount to be set by the user or the like, $F(L^*)$ represents the first correction factor, $F(c^*)$ represents the second correction factor, and $F(h^*)$ represents the third correction factor.

The printer 1 is configured such that the lightness value modulation amount $\Delta L^*$, the saturation value modulation amount $\Delta c^*$, and the hue value modulation amount $\Delta h^*$ are set by the user. The correction program 4a executes the correction of formula 1 to formula 3 on the basis of the lightness value modulation amount $\Delta L^*$, the saturation value modulation amount $\Delta c^*$, and the hue value modulation amount $\Delta h^*$.

Figure 4:
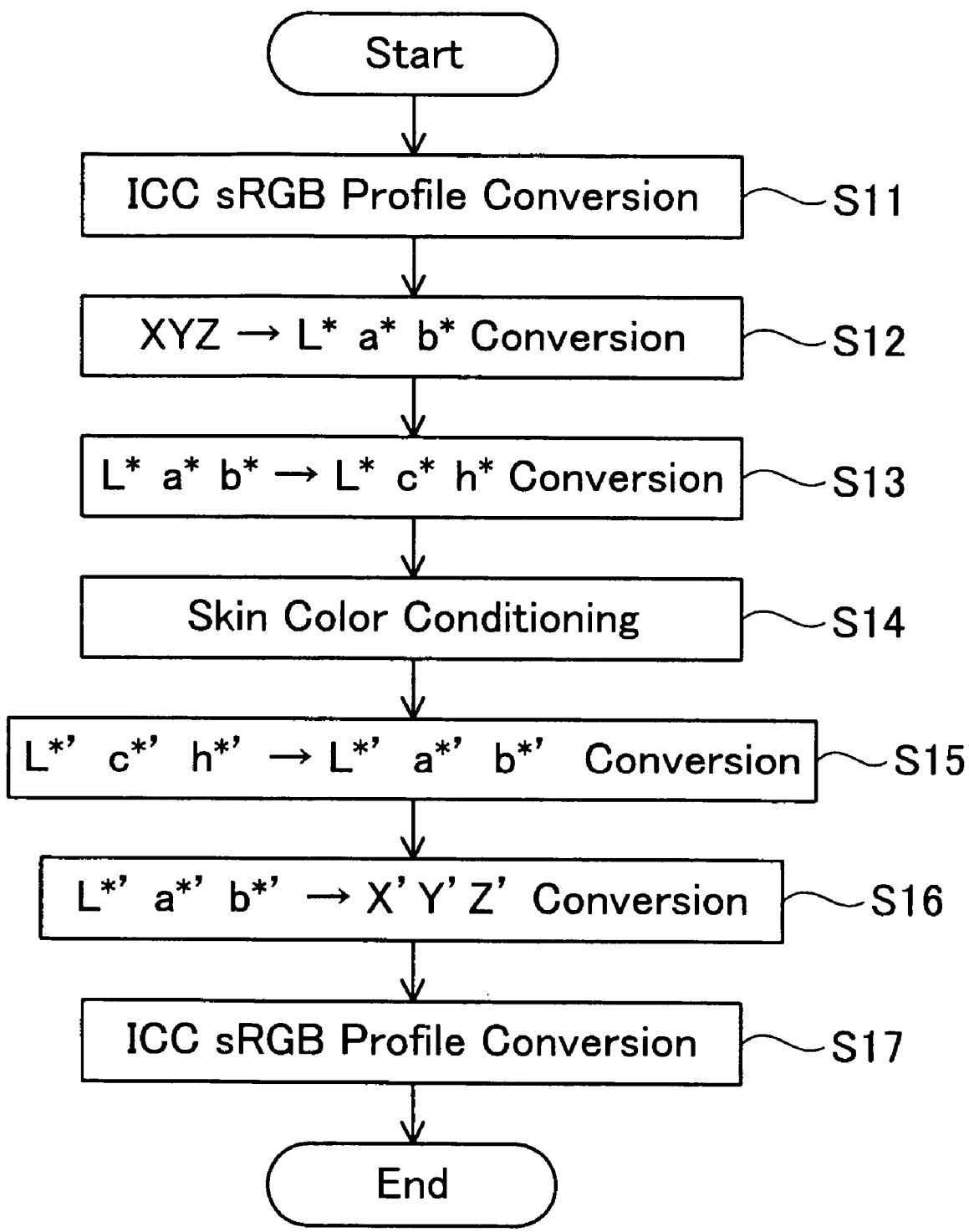
FIG. 4 shows a process sequence for modulating and printing out skin color.

FIG. 4 is a flowchart showing the process of the correction program 4a. A situation is described in which the color image data formed by the RGB values is input from the external media 40 mounted on the external media slot 6, and is converted to R'G'B' values of which the specified color, the skin color, has been corrected.

First, the ICC sRGB profile conversion is performed, and the RGB values are converted into XYZ values (S11). Under normal circumstances it is preferred that the ICC profile of a monitor or the ICC profile of a digital camera is used. However, for the sake of simplicity, an ICC sRGB profile is used in the present embodiment. The ICC profile represents a color conversion file format describing color characteristics of devices that are specified by the ICC (International Color Consortium). Furthermore, the sRGB is a standard color space for a monitor created in the attempt to unify color reproducibility and color space for devices with differing RGB.

Next, the XYZ values converted by the ICC sRGB profile conversion are converted into the lightness value $L^*$, color $a^*$, and color $b^*$ (S12). This conversion is performed by utilizing a known conversion formula. Next, the values of the lightness value $L^*$, color $a^*$, and color $b^*$ are converted to solve for the lightness value $L^*$, the saturation value $c^*$, and the hue value $h^*$ (S13). In this case, the lightness value $L^*$ is not changed. The saturation value $c^*$ and the hue value $h^*$ are found by computing the following formulas.

$$c^* = \sqrt{(a^*)^2 + (b^*)^2}$$

$$h^* = \left(\arctan\frac{b^*}{a^*}\right) \times \frac{180}{\pi}$$

Next, a skin color correction process is performed based on the lightness value $L^*$, the saturation value $c^*$, and the hue value $h^*$ (S14). The skin color correction process will be described below in detail with reference to FIG. 5. The corrected lightness value L*', the corrected saturation value c*', and the corrected hue value h* are obtained by means of the skin color correction process.

Next, the corrected lightness value L*', the corrected saturation value c*', and the corrected hue value h*' are inversely converted to the corrected lightness value L*', a corrected color value a*', and a corrected color value b*' (S15). Then, the corrected lightness value L*', the corrected color value a*', and the corrected color value b*' are inversely converted to X'Y'Z' values (S16). Furthermore, the X'Y'Z' values are inversely converted to R'G'B' values by the ICC sRGB profile conversion (S17).

The printer 1 corrects the skin color of the input RGB values and converts them into R'G'B' values. These converted R'G'B' values are converted into the CMYK values by the transformation program 4e. The printing control program 4f performs a printing process based on these CMYK values.

Figure 5:
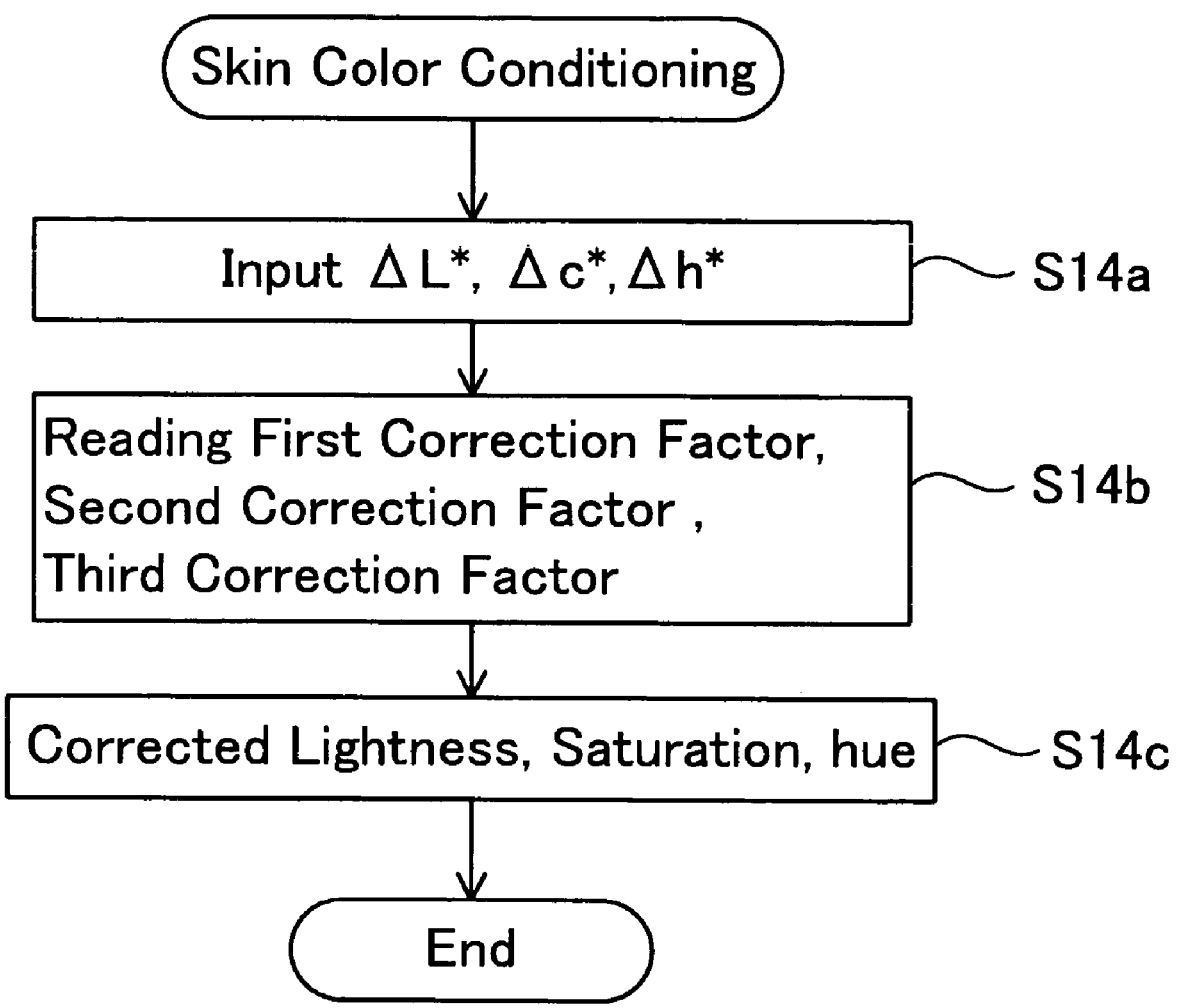
FIG. 5 shows a process sequence for correcting a specified color.

FIG. 5 is a flowchart showing the details of the skin color correction process (S14) of FIG. 4. First, the user inputs the lightness modulation amount ΔL*, the saturation modulation amount Δc*, and the hue modulation amount Δh* (S14a). Next, the first correction factor corresponding to the lightness value L* found in the process of S13, the second correction factor corresponding to the saturation value c* found in the process of S13, and the third correction factor corresponding to the hue value h* found in the process of S13 are obtained by referring to the first to third correction factor curves 4b stored in the ROM 4 (S14b). Then, the formulas 1 to 3 are utilized to compute the corrected lightness value L*', the corrected saturation value c*', and the corrected hue value h*' (S14c).

In the first embodiment, the first correction factor which depends on the lightness value, the second correction factor which depends on the saturation value, and the third correction factor which depends on the hue value are utilized. The first correction factor is given a value of 1.0 in the range of the lightness value of the specified color, and in the ranges that are not the specified color, monotonically decreases as the lightness value deviates from the lightness value of the specified color. The second correction factor has been given a value of 1.0 in the range of the saturation value of the specified color, and in the ranges that are not the specified color, the value monotonically decreases as the saturation value deviates from the saturation value of the specified color. The third correction factor is given a value of 1.0 in the range of the hue value of the specified color, and in the ranges that are not the specified color, monotonically decreases as the hue value deviates from the hue value of the specified color.

The lightness, saturation, and hue values of the specified color are corrected by a large amount, and the amount of correction decreases as deviation increases from the lightness, saturation, and hue values of the specified color. When correcting the specified color, it is possible to prevent the occurrence of a situation where the amount of correction of the specified color and the amount of correction of the colors close to the specified color differ discontinuously. There is a reduction in the number of times the modulation amount of the lightness, saturation, and hue values must be set, and correction efficiency is improved.

A second embodiment of the present invention will be described. The second embodiment is a variant of the first embodiment. Descriptions will only be provided for components that differ from those in the first embodiment, and descriptions for components that are identical to those in the first embodiment will be omitted.

The second embodiment can convert the inputted RGB values directly into R'G'B' values. Based on the configured modulation amount, a look-up table that performs color correction of the specified color in advance is created. This look-up table is stored in the RAM 3 or the ROM 4. If the look-up table is stored in the RAM 3, it is preferred that the power source has a backup to prevent the stored memory from being lost when the power source of the printer 1 is cut off. The inputted RGB values are converted into the R'G'B' values by referring to the look-up table.

Figure 6:
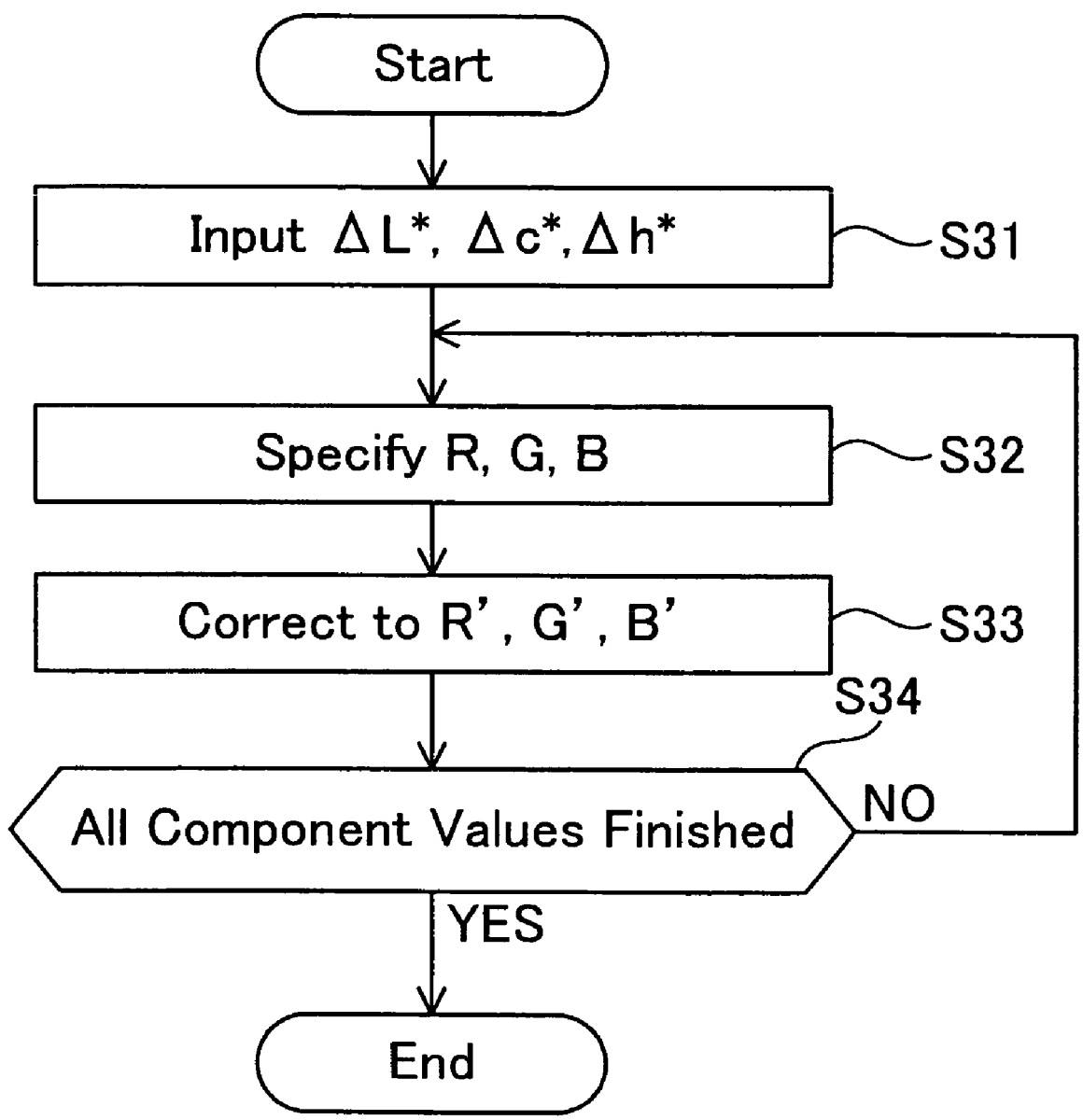
FIG. 6 shows a process sequence for creating a look-up table to be utilized in the process for correcting a specified color.

The method of creating the look-up table will be described with reference to FIG. 6.

First, the lightness modulation amount ΔL*, the saturation modulation amount Δc*, and the hue modulation amount Δh* are input (S31). The lightness modulation amount ΔL*, the saturation modulation amount Δc*, and the hue modulation amount Δh* can be input by the user. Alternatively, optimum values can be input in advance by the manufacturer of the printer 1. Then, the RGB values are input to an R axis grid, a G axis grid, and a B axis grid, which constitute the look-up table (S32). Next, the RGB values of the specified color are corrected and converted into the R'G'B' values (S33). The processes of converting the RGB values into the R'G'B' values are the same as the processes of S11~S17 shown in FIG. 4.

Next, it is determined whether the corrected R'G'B' values have been input to the R axis grid, the G axis grid, and the B axis grid which constitute the look-up table (S34). If the corrected R'G'B' values have not been input to all of the R axis grid, the G axis grid, and the B axis grid (S34: No), the process returns to S32. If the corrected R'G'B' values have been input to the R axis grid, the G axis grid, and the B axis grid (S34: Yes), the process of creating the look-up table is finished.

In the second embodiment, the look-up table for directly converting the RGB values into the R'G'B' values is created in advance. When this look-up table is stored in a memory, it is no longer necessary to compute the lightness modulation amount, saturation modulation amount, and hue modulation amount from the lightness modulation amount, saturation modulation amount, hue modulation amount, first correction factor curve, second correction factor curve, and third correction factor curve, all of which were input by the user. It is thus possible to correct the specified color using a small number of processes.

A third embodiment of the present invention will now be described. The third embodiment is an adaptation of the first embodiment. Descriptions will only be provided for components that differ from those in the first embodiment, and descriptions for components that are identical to those in the first embodiment will be omitted.

The third embodiment involves a technique for creating a frequency distribution for the color image of a lightness level, saturation level, and hue level for each pixel that constitutes a predetermined area containing a large amount of the specified color. A curve approximating a histogram of the created lightness level will be the first correction factor curve, a curve approximating a histogram of the created saturation level will be the second correction factor curve, and a curve approximating a histogram of the created hue level will be the third correction factor curve.

Figure 7:
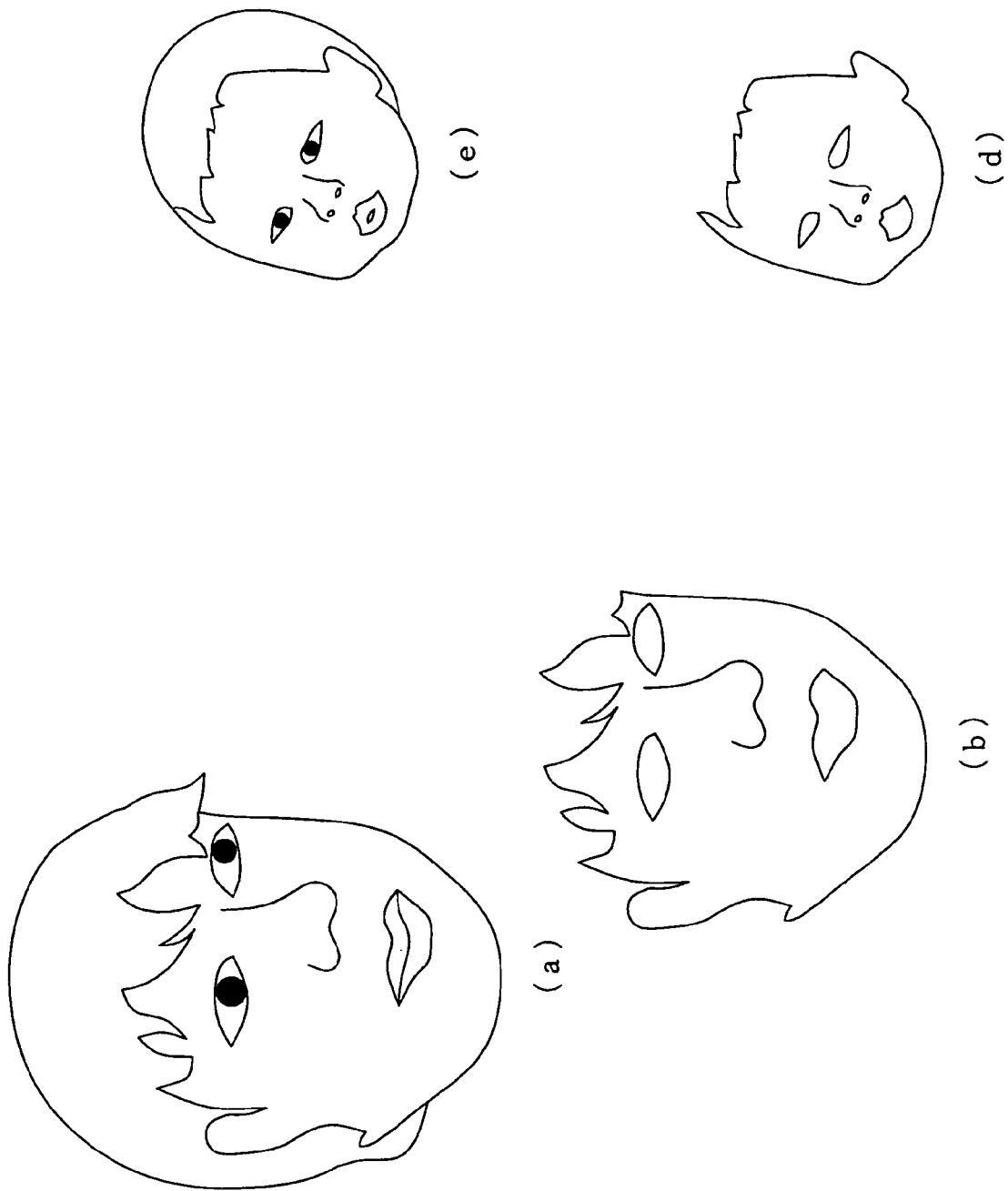
FIG. 7 schematically shows sample images.

FIG. 7 shows examples of color images. These schematically show the process of selecting regions containing a large amount of the specified color. FIG. 7(a) shows an image of an adult's face taken with a digital camera. FIG. 7(b) shows an image in which portions differing from the specified color, such as the hair and eyes, have been removed from the image of FIG. 7(a). FIG. 7(c) shows an image of a child's face taken with a digital camera. FIG. 7(d) shows an image in which portions differing from the specified color, such as the hair and eyes, have been removed from the image of FIG. 7(c).

The images of FIG. 7(b) and FIG. 7(d) show regions consisting of the specified color (in these examples, skin color), and regions adjacent therewith.

Figure 8:
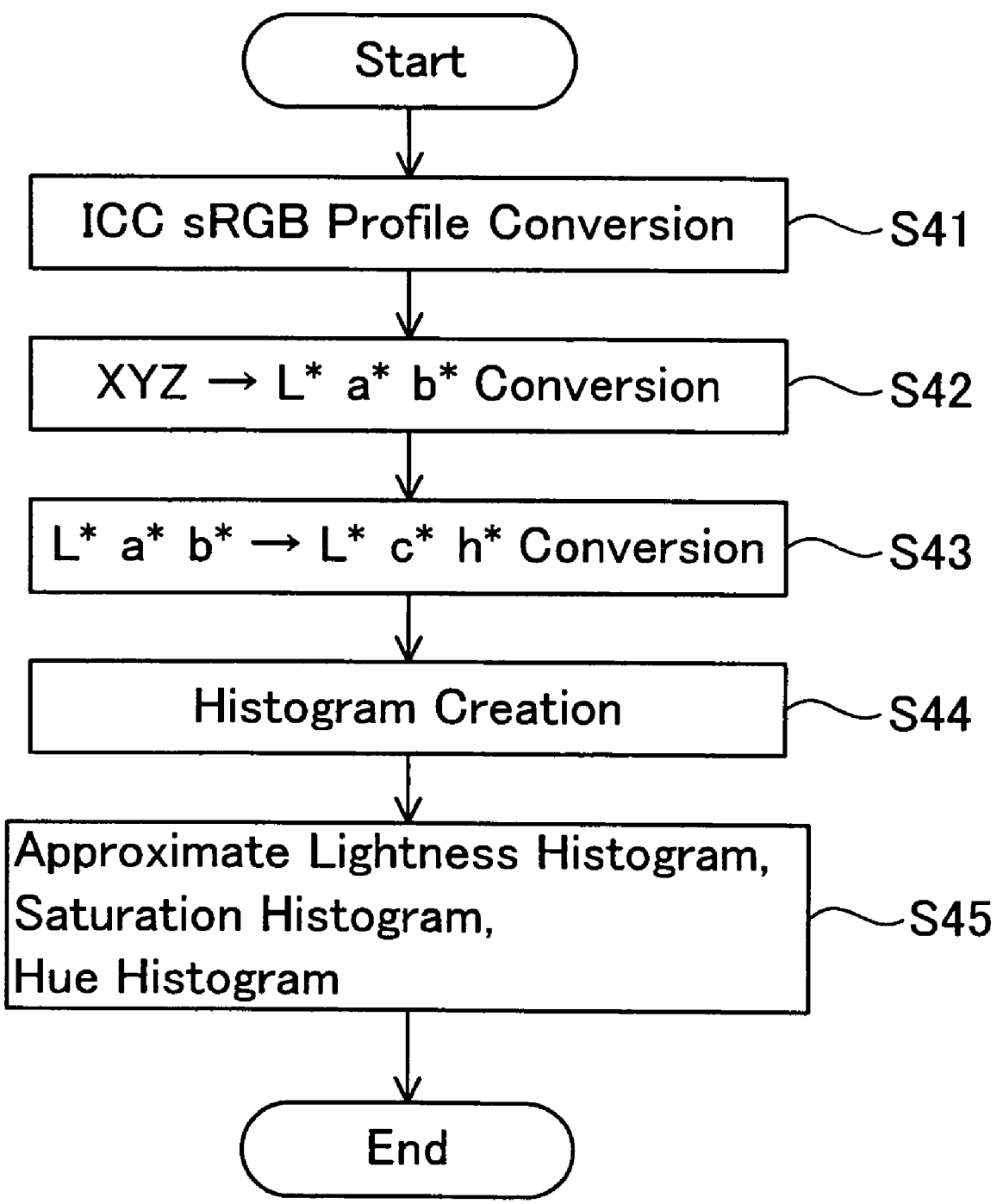
FIG. 8 shows a process sequence for finding approximating functions.

FIG. 8 shows a process for finding the correction factors from the image of FIG. 7(b) or FIG. 7(d).

First, the RGB values of the image are input for each pixel, then the RGB values are converted into XYZ values by the ICC sRGB profile conversion (S41).Then, the XYZ values are converted into L*, a*, b* values (S42). Next, the L*, a*, b* values are converted into L*, c*, h* values (S43). Since this is the same as the first embodiment, the description of the conversion process is omitted.

Next, the number of pixels that have a lightness value for each lightness level is counted to create a histogram for the lightness value (S44). The histogram is, for example, a method for counting the number of pixels showing a lightness level of 0 and the number of pixels showing a lightness level of 1, and checking how many pixels are present at each lightness level. A histogram is created for the lightness values wherein the lightness level corresponds to integers between 0 and 100. Histograms for saturation and hue are created in the same manner (S44).

Figure 9:
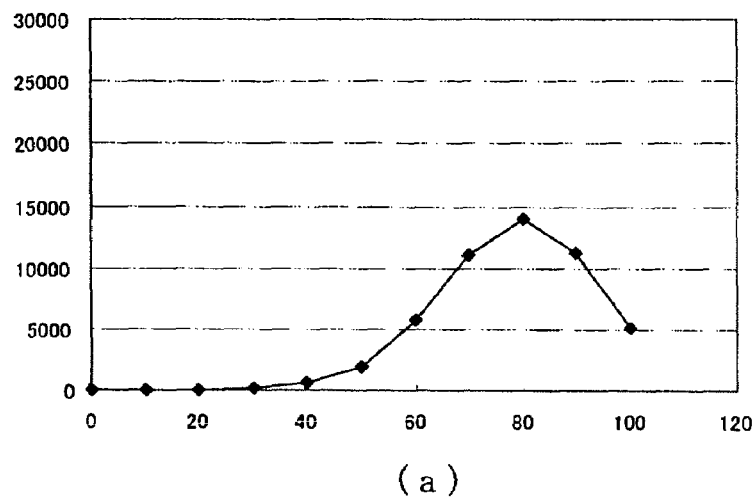
FIG. 9 shows histograms created by computing pixel counts for a lightness value, a saturation value, and a hue value.
Figure 9:
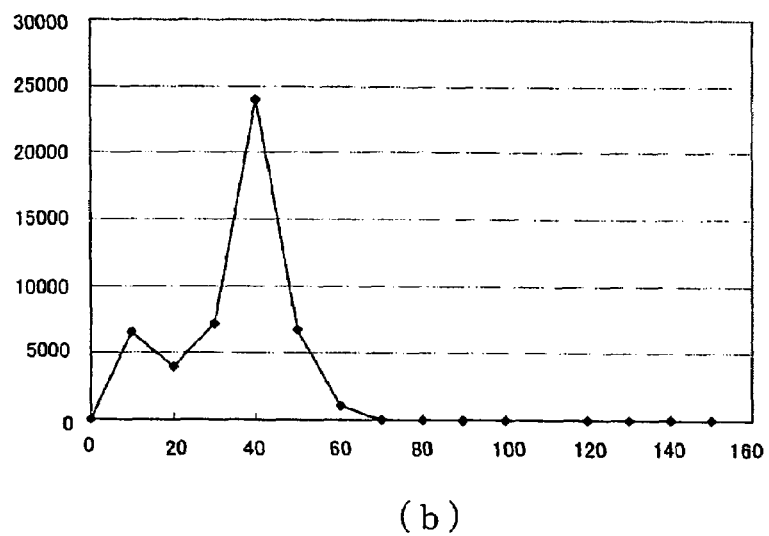
Figure 9:
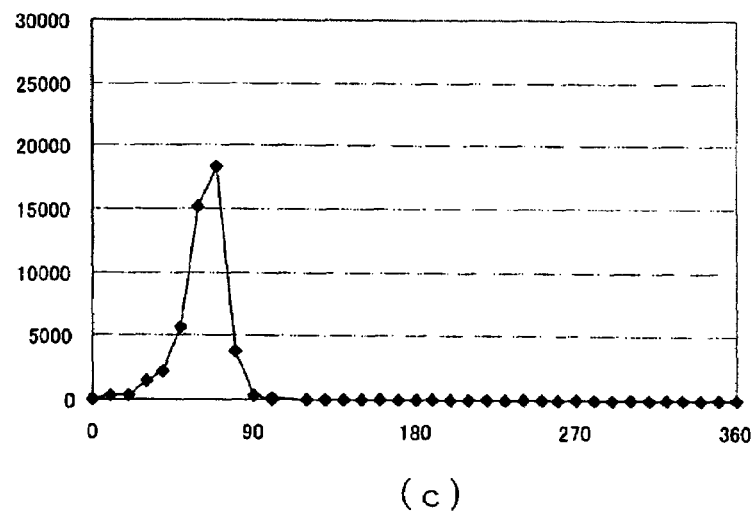

FIG. 9 shows an example of a histogram created in the process of S44.

FIG. 9(a) shows a lightness histogram. The lightness level is shown on the horizontal axis, and the pixel counts are shown on the vertical axis. In the histogram of FIG. 9(a), the lightness level has a maximum value of approximately 80, and the maximum frequency is approximately 14,000 pixels.

FIG. 9(b) shows a saturation histogram. The saturation level is shown on the horizontal axis, and the pixel counts are shown on the vertical axis. In the histogram of FIG. 9(b), the saturation level has a maximum value of approximately 40, and the maximum frequency is approximately 24,000 pixels.

FIG. 9(c) shows a hue histogram. The hue level is shown on the horizontal axis, and the pixel counts are shown on the vertical axis. In the histogram of FIG. 9(c), the hue level has a maximum value of approximately 70, and the maximum frequency is approximately 18000 pixels.

Next, an approximating function is found for approximating each of the lightness histogram, the saturation histogram, and the hue histogram (S45). The approximating function utilizes a Gaussian function that shows normal distribution. It is possible to find a function that best approximates the histogram by using a Gaussian function.

The Gaussian function is represented by the following formula.

$$\text{Gauss}(x, a, b) = \text{EXP}\left(\frac{-(x-a)^2}{2b}\right)$$

The approximating function is assumed to be the following formula.

$$\text{Fit}(x, a, b) = \text{Gauss}(x, a, b) \times (2 - \text{Gauss}(x, a, b))$$

x=L* in the case of the approximating function for lightness, x=c* in the case of the approximating function for saturation, and x=h* in the case of the approximating function for hue.

Using the above approximating function, the approximating function for approximating the lightness histogram is found using the method of least squares for the lightness value. The approximating functions for saturation and hue are found in the same manner. The method of least squares is a method whereby, if the approximating function for lightness is Fit (L*) and the value corresponding to the lightness histogram is hist (L*), the "a" and "b" values which form the minimum of the "Curv" value are found when the following function is computed.

$$\text{Curv} = \sum_{L^*=0}^{100} \{\text{Fit}(L^*) - \text{hist}(L^*)\}^2$$

Moreover, Σ signifies the summation of all values that can be inserted for L*. In the present embodiment, the range of L* is 0 to 100. This computation can be found by sequentially modifying the values of "a" and "b" using a computer. Saturation and hue can also be found using the same type of computation.

In the case of the histograms shown in FIG. 9, the lightness approximating function is Fit (L*, 78, 220). The saturation approximating function is Fit (c*, 42, 140). The hue approximating function is Fit (h*, 73, 220).

When the method of least squares is not used, the values of "a" and "b" are sequentially modified, and an approximating function curve is found. The approximating function curve and the histogram are contrasted visually, and the values of "a" and "b" that approximate the histogram can be found.

In the third embodiment, the lightness histogram, the saturation histogram, and the hue histogram are created for the specified regions containing a large amount of the specified color. The specified color can be corrected by a large amount because function curves that approximate these histograms form correction factor curves. Simultaneously, correction of the portions adjacent to the specified color can be restrained. As a result, it is possible to perform modulation that corresponds to the subject of the color image.

Consequently, if the specified color is skin color, it is possible to utilize correction factors that correspond to adult skin color, children skin color, male skin color, female skin color, or skin color of a particular ethnic group. Further, it is possible to store in advance a plurality of types of a function that approximates the correction factor, to select the function utilizing the operation panel 30, and to correct the color image.

A fourth embodiment will now be described. The fourth embodiment is an adaptation of the first embodiment. Descriptions will only be provided for components that differ from those in the first embodiment, and descriptions for components that are identical to those in the first embodiment will be omitted.

Figure 10:
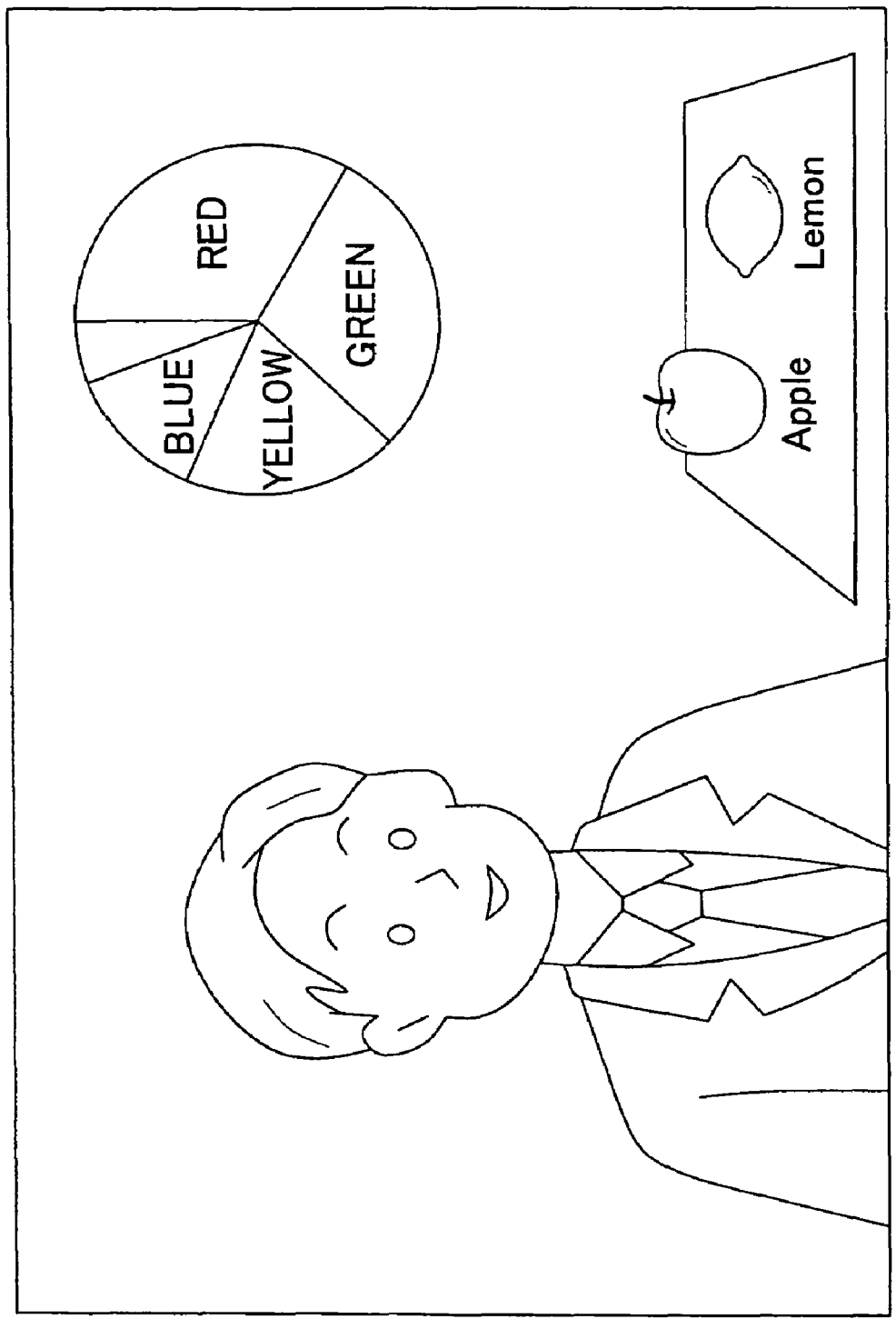
FIG. 10 schematically shows a sample image on which to perform the correction process.

There are occasions when, as in the image shown in FIG. 10, the image represents not just a human face, but also an apple having a color close to the primary color red, a lemon having a color close to the primary color yellow, or a color graph showing the division of the primary colors red, green, yellow, blue, etc. In the present embodiment, when the specified color and a primary color different from the specified color are represented in one image, the primary colors are maintained without being corrected, and the specified color is corrected in a concentrative manner.

While correcting the specified color (skin color in the present embodiment), a fourth correction factor can be set to preventing the primary colors from being corrected. The fourth correction factor is determined by referring to a fourth correction factor curve. The fourth correction factor curve is represented by a curve that has a value of 1.0 in a range where a saturation level is between 0 and approximately 80% of the maximum saturation level, and monotonically decreases toward 0.0 in a range from approximately 80% of the maximum saturation level to the maximum saturation level.

If the lightness value prior to correction is L*, and the corrected lightness value is L*', corrections in the fourth embodiment are performed using the following formula.

$$L^{*'}=L^{*}+\Delta L^{*}\times F(L^{*})\times F(c^{*})\times F(h^{*})\times F(c^{*}h^{*}) \quad \text{Formula 4.}$$

Above, ΔL* represents the lightness value modulation amount set by the user, F (L*) represents the first correction factor, F (c*) represents the second correction factor, F (h*) represents the third correction factor, and F (c*h*) represents the fourth correction factor.

Similarly, if the saturation value prior to correction is c*, and the corrected saturation value is c*', corrections in the fourth embodiment are performed using the following formula.

$$c^{*'}=c^{*}+\Delta c^{*}\times F(L^{*})\times F(c^{*})\times F(h^{*})\times F(c^{*}h^{*}) \quad \text{Formula 5.}$$

Above, Δc* represents the saturation value modulation amount set by the user.

Similarly, if the hue value prior to correction is h*, and the corrected hue value is h*', the following formula is utilized.

$$h^{*'}=h^{*}+\Delta h^{*}\times F(L^{*})\times F(c^{*})\times F(h^{*})\times F(c^{*}h^{*}) \quad \text{Formula 6.}$$

Above, Δh represents the hue value modulation amount set by the user.

Next, the method for finding the fourth correction factor will be described.

Figure 11:
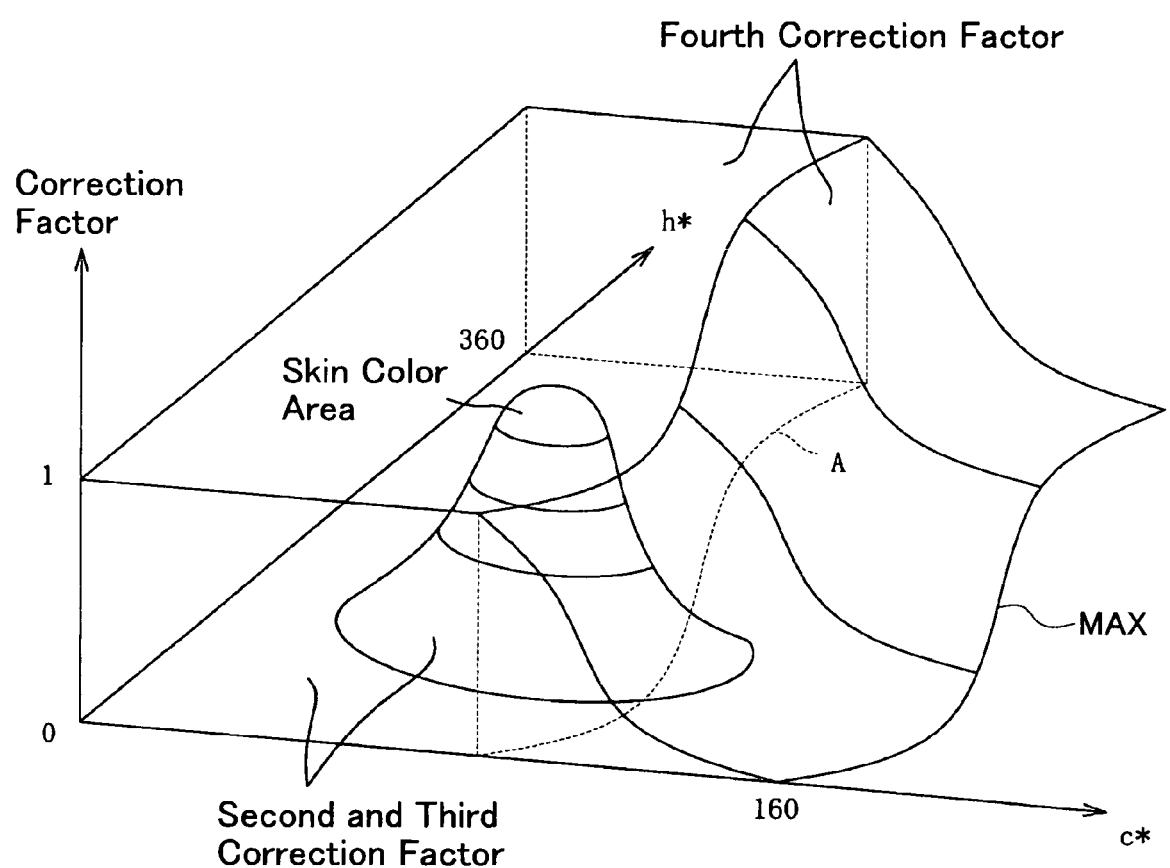
FIG. 11 is a figure stereoscopically showing the second correction factor, the third correction factor, and a fourth correction factor along the two-dimensional plane of the saturation value (c*) and the hue value (h*).

FIG. 11 is a figure stereoscopically showing the second correction factor, the third correction factor, and the fourth correction factor. c* represents the saturation value, h* represents the hue value, and the correction factor values are shown on the vertical axis. When skin color is the specified color, the second correction factor and the third correction factor rise in a peak shape as shown in the region near the center of FIG. 11. In the portion that is not rising in a peak shape, the second correction factor and the third correction factor are both 0.0. The fourth correction factor shows 1.0 at a plane formed at the hue axis and the correction factor axis (the saturation value c* is zero and the range of minimum saturation value), and continues to show 1.0 until approximately 80% (shown by the line A in the figure) of the maximum saturation levels corresponding to the hue levels (shown by the line MAX) is reached. The range between approximately 80% of the maximum saturation levels corresponding to each hue level and the maximum saturation levels (the space between the line A and the line MAX) is shown by a curve monotonically decreasing toward 0.0.

Figure 12:
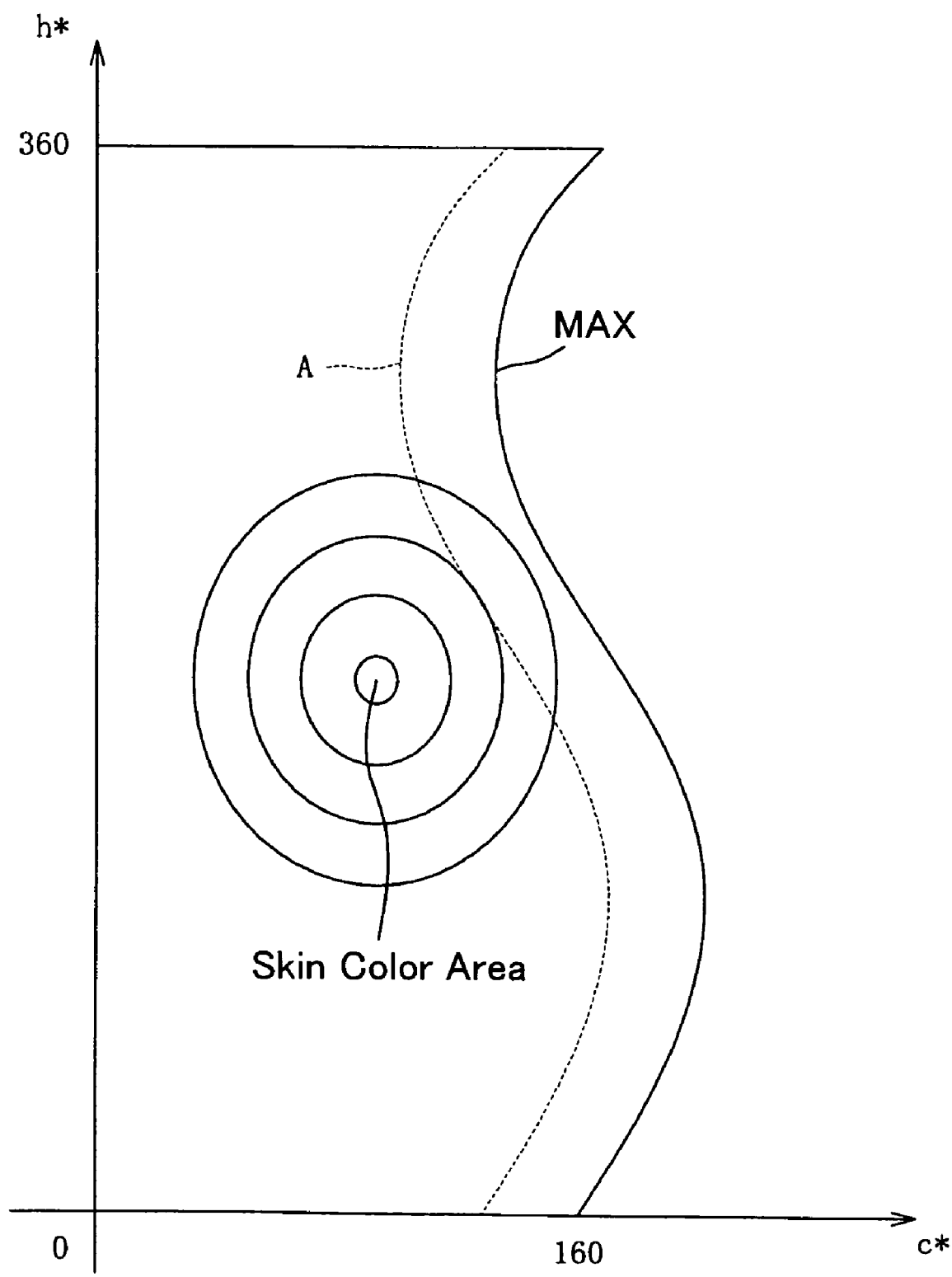
FIG. 12 shows FIG. 11 as a plan view.

The primary colors are close to a region showing the maximum saturation values of each hue. As a result, the fourth correction factor is approximately 0.0 in the region showing the primary colors. Correction of the primary colors can be prevented by means of this method. FIG. 12 shows a plan view of the plane of the hue value and saturation value shown in FIG. 11. "MAX" in the figure represents the maximum saturation level for each hue. "A" in the figure shows the position of approximately 80% saturation of the maximum saturation level for each hue.

The monotonically decreasing curve representing a portion of the fourth correction factor can be created utilizing a sine function or the like. Alternatively, the fourth correction factor can be stored in advance every 10 or every 15 levels for hue levels ranging from 0 to 360, and the fourth correction factor can be found using linear interpolation or the like for the hue levels therebetween.

A method for finding the maximum value of saturation corresponding to each hue level will be described. First, a printing sheet such as glossy paper or normal paper is placed in the paper supply apparatus of the printer 1. Next, the R values, the G values, and the B values are each varied from 0 to 255 at each predetermined region of the printing sheet, and the printing sheet is printed. Then, the color of each region of the printing sheet is measured using a colorimeter, and a plurality of L*a*b* values is obtained. Then, the c*h* values are computed from the a*b* values. Since the method of computation has been described above, a description thereof is omitted. The maximum value of the saturation is computed for each converted hue level. With this method, it is possible to find the maximum saturation level "MAX" corresponding to the hue levels.

The maximum saturation level corresponding to each hue level can be determined for each type of printing sheet.

The fourth correction factor curve can be stored in the fourth correction factor curve 4c of the ROM 4. When the saturation and hue of the input color image are specified, the fourth correction factor can be obtained by referring to the ROM 4.

A fifth embodiment of the present invention will now be described. The fifth embodiment is an adaptation of the first embodiment. Descriptions will only be provided for components that differ from those in the first embodiment, and descriptions for components that are identical to those in the first embodiment will be omitted.

In the present embodiment, when printing is performed based on the corrected lightness value, corrected saturation value, and corrected hue value, it is possible to modify the correction amount to correspond to the type of printing sheet. That is, when the specified color (skin color in the present embodiment) is to be corrected, a fifth correction factor is used so that the correction amount corresponds to the color gamut of each printing sheet.

Figure 13:
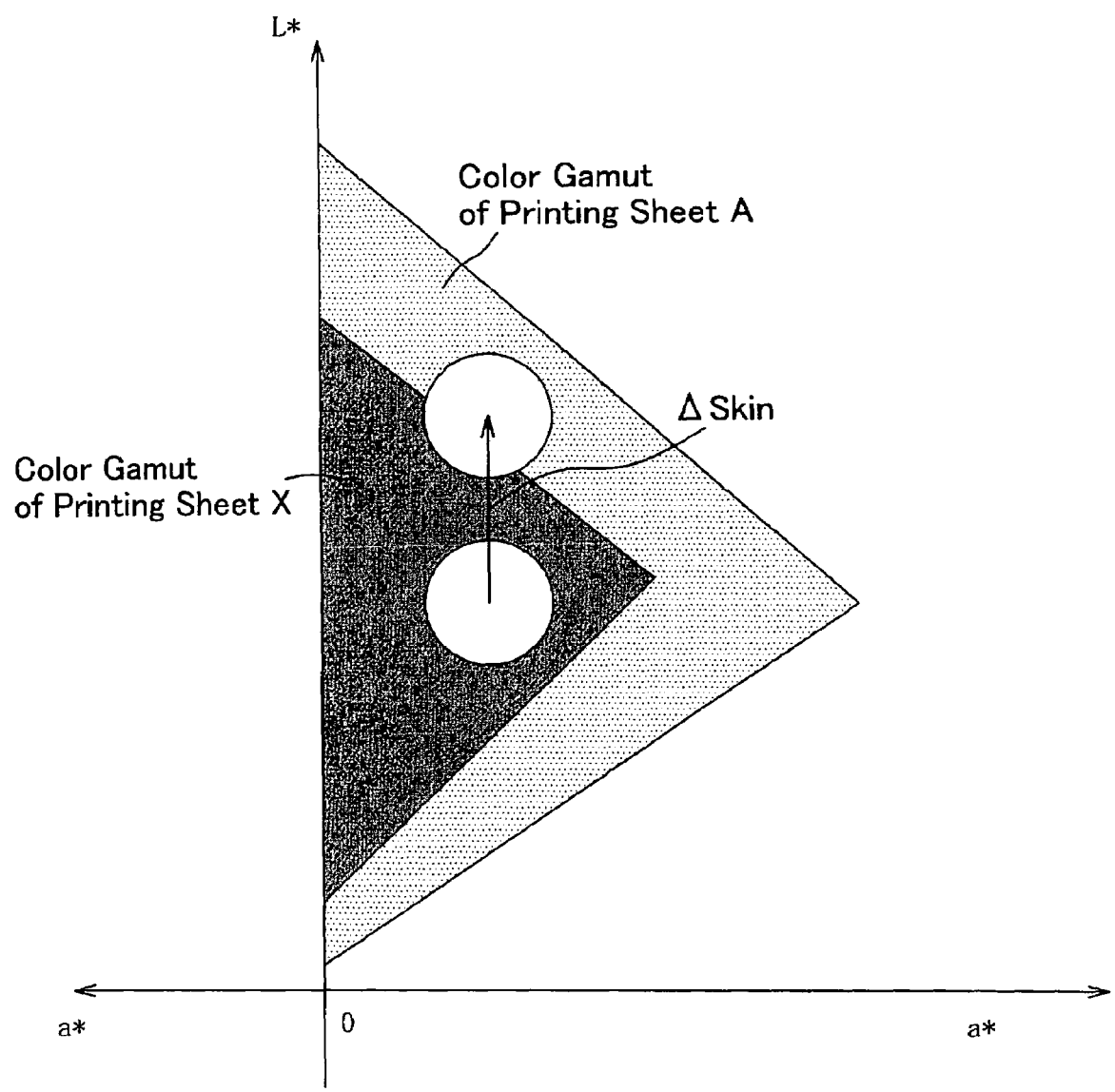
FIG. 13 shows that, when the color gamut differs according to a print medium and the specified color has been corrected, a region showing the specified color is located outside the color gamut.

The necessity for the fifth correction factor will now be described. FIG. 13 schematically shows the color gamut for differing types of printing sheet. Color a* is shown on the horizontal axis, and lightness L* is shown on the vertical axis. The color gamut has a three dimensional space represented by the lightness L* axis, the color a* axis, and the color b* axis, but only the relationship between the lightness L* axis and the color a* axis will be described.

The color gamut when printing was performed on glossy paper A is shown by a color gamut A, and the color gamut when printing was performed on normal paper X is shown by a color gamut X. The region of the color gamut X is located within the region of the color gamut A, so color gamut X is a smaller region than color gamut A.

A region representing the specified color (skin color in the present embodiment) is the region enclosed by a circle. When the lightness modulation amount, the saturation modulation amount, and the hue modulation amount are set for printing on glossy paper, the corrected lightness value, corrected saturation value, and corrected hue value are obtained by following the above correction formulas. The region representing the corrected specified color moves as shown by the arrow in FIG. 13. If the specified color is corrected carelessly, the region X of the normal paper may be exceeded. When printing is performed on the portion in which the color gamut has been exceeded, the color gradation breaks down and appears unnatural. That is, when printing is performed on glossy paper, a lightness modulation amount, a saturation modulation amount, and a hue modulation amount corresponding to the color gamut A of the glossy paper must be set, and when printing is performed on normal paper, a lightness modulation amount, a saturation modulation amount, and a hue modulation amount corresponding to the color gamut X of the normal paper must be set.

Since it is too time consuming to set the lightness modulation amount, saturation modulation amount, and hue modulation amount for each type of printing sheet, the fifth correction factor corresponding to the types of printing sheet, is needed.

A method for finding the fifth correction factor will be described.

If the volume of a printable color space of a standard printing sheet is "x", and the volume of a printable color space of a selected printing sheet is "a", the fifth correction factor F (x) of the selected printing sheet is represented by the following formula.

$$F(x)=a/x.$$

The fifth correction factor F (x) of the selected printing sheet is determined in accordance with the type of printing sheet. The fifth correction factor F (x) is obtained by the manufacturers of the printer 1 by performing measurements or the like in advance, and the fifth correction factor corresponding to the types of printing sheet is stored in the ROM 4.

The method of finding the volume "x" of the color space or the volume "a" of the color space will now be described.

First, the standard printing sheet is set in the paper supply apparatus of the printer 1. Next, the R values, the G values, and the B values are each varied from 0 to 255 in each predetermined region of the printing sheet and, and the printing sheet is printed. Then, the color of each region of the printing sheet is measured using a calorimeter, and a plurality of L*a*b* values is obtained. Then the L*a*b* values are positioned on the L*a*b* axes, and the volume is determined to be the volume "x" of the printable color space of the standard printing sheet. The volume "a" of the printable color space of the selected printing sheet is found in the same manner.

Figure 14:
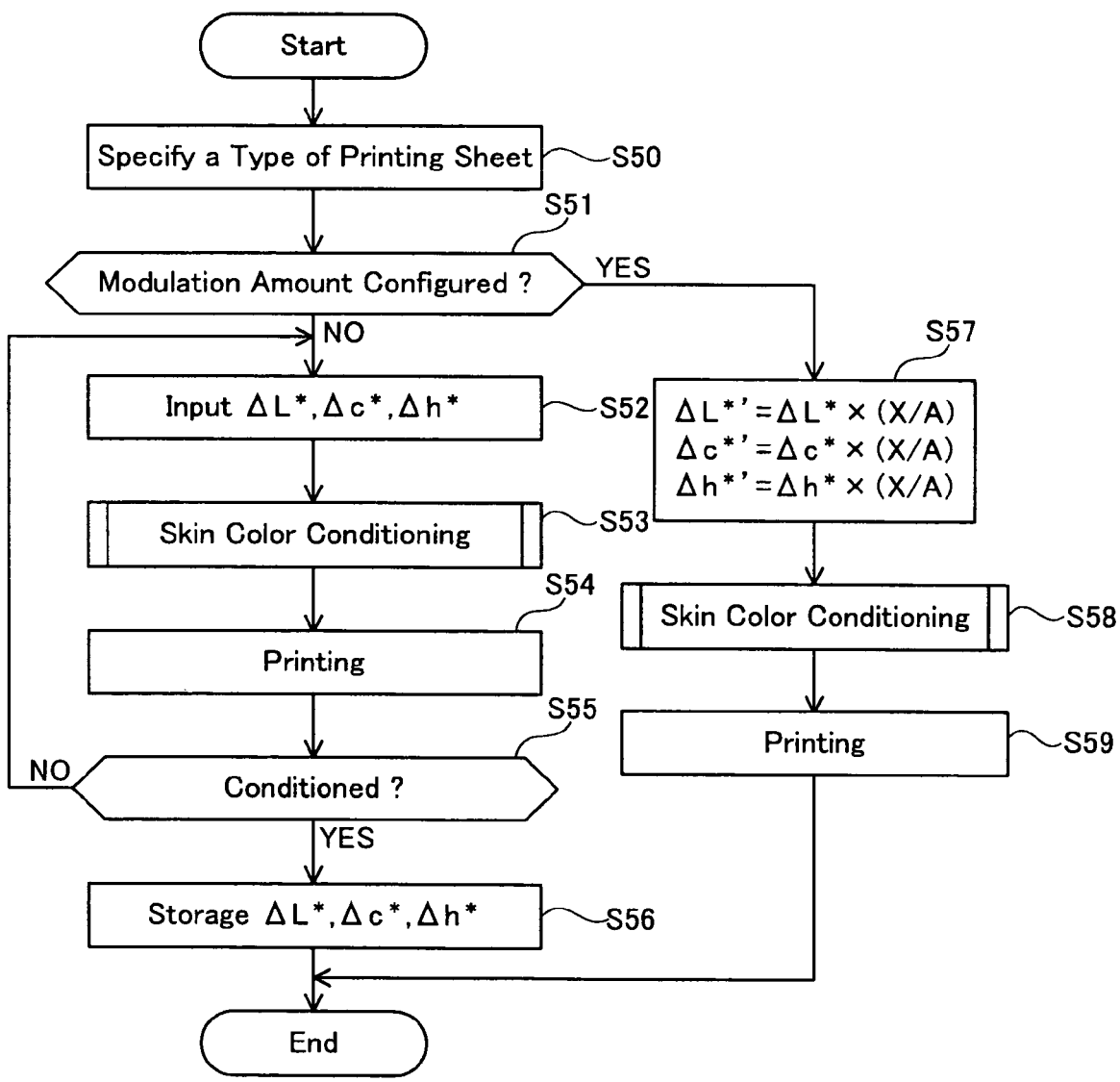
FIG. 14 shows the sequence of a process for calculating a fifth correction factor utilized in a fifth embodiment.

FIG. 14 shows a process whereby the printer 1 prints the specified color (the skin color in the present embodiment) on the selected printing sheet.

First, the user places the selected printing sheet on the paper supply apparatus of the printer 1 and selects the type of printing sheet using the operation panel 30. The CPU 2 stores the selected type of printing sheet in the RAM 3 (S50). Next, it is determined whether the lightness modulation amount ΔL*, the saturation modulation amount Δc*, and the hue modulation amount Δh* are set (S51). If the lightness modulation amount ΔL*, the saturation modulation amount Δc*, and the hue modulation amount Δh* are not set (S51: No), the user inputs the lightness modulation amount ΔL*, the saturation modulation amount Δc*, and the hue modulation amount Δh* (S52). Next, the correction process of the specified color (the skin color) is performed (S53). The method of the specified color correction process is the same as the method described above, and therefore a description thereof is omitted. Next, printing is performed of the corrected image (S54). The user verifies the image printed on the printing sheet, determines whether the correction process is sufficient, and decides whether to finish the correction process by operating the operation panel 30 (S55). The CPU 2 detects the operation input from the operation panel 30 and, when the correction process has been completed (S55: Yes), the lightness modulation amount ΔL*, the saturation modulation amount Δc*, the hue modulation amount Δh* and the type of selected printing sheet are stored in a predetermined region of the RAM 3 (S56). If correction is insufficient and the correction process is not complete (S55: No), the process returns to S52.

If the lightness modulation amount ΔL*, the saturation modulation amount Δc*, and the hue modulation amount Δh* of the specified color are set (S51: Yes), the fifth correction factor corresponding to the selected printing sheet is multiplied by each of the lightness modulation amount ΔL*, the saturation modulation amount Δc*, and the hue modulation amount Δh* (S57). The fifth correction factor corresponding to the selected printing sheet is read from the ROM 4. Then, the correction process of the specified color (the skin color) is performed using the corrected lightness modulation amount ΔL*', the corrected saturation modulation amount Δc*', and the corrected hue modulation amount Δh*' (S58), and the image is printed (S59). The method of the correction process of the specified color is the same as the method described above, and a description thereof is omitted.

In a case where modulation is performed one time so that adequate printing can be performed for a predetermined type of printing sheet, and then printing of a differing printing sheet is performed, using the fifth correction factor makes it possible to again perform printing that has adequate modulations without repeating the modulation.

When image correction corresponding to the selected type of printing sheet is performed, the corrected lightness, corrected saturation, and corrected hue can be determined using the following formulas.

If the lightness prior to correction is L* and the corrected lightness is L*', correction in the fifth embodiment is performed using the following formula.

$$L^{*\prime}=L^{*}+\Delta L^{*}\times F(L^{*})\times F(c^{*})\times F(h^{*})\times F(x)$$  Formula 7.

Above, ΔL* represents the lightness value modulation amount set by the user, F (L*) represents the first correction factor, F (c*) represents the second correction factor, F (h*) represents the third correction factor, and F (x) represents the fifth correction factor.

Similarly, if the saturation prior to correction is c* and the corrected saturation is c*', correction in the fifth embodiment is performed using the following formula.

$$c^{*\prime}=c^{*}+\Delta c^{*}\times F(L^{*})\times F(c^{*})\times F(h^{*})\times F(x)$$  Formula 8.

Above, Δc* represents the saturation value modulation amount set by the user.

Similarly, if the hue prior to correction is h* and the corrected hue is h*', correction in the fifth embodiment is performed using the following formula.

$$h^{*\prime}=h^{*}+\Delta h^{*}\times F(L^{*})\times F(c^{*})\times F(h^{*})\times F(x)$$  Formula 9.

Above, Δh* represents the hue value modulation amount set by the user.

Figure 15:
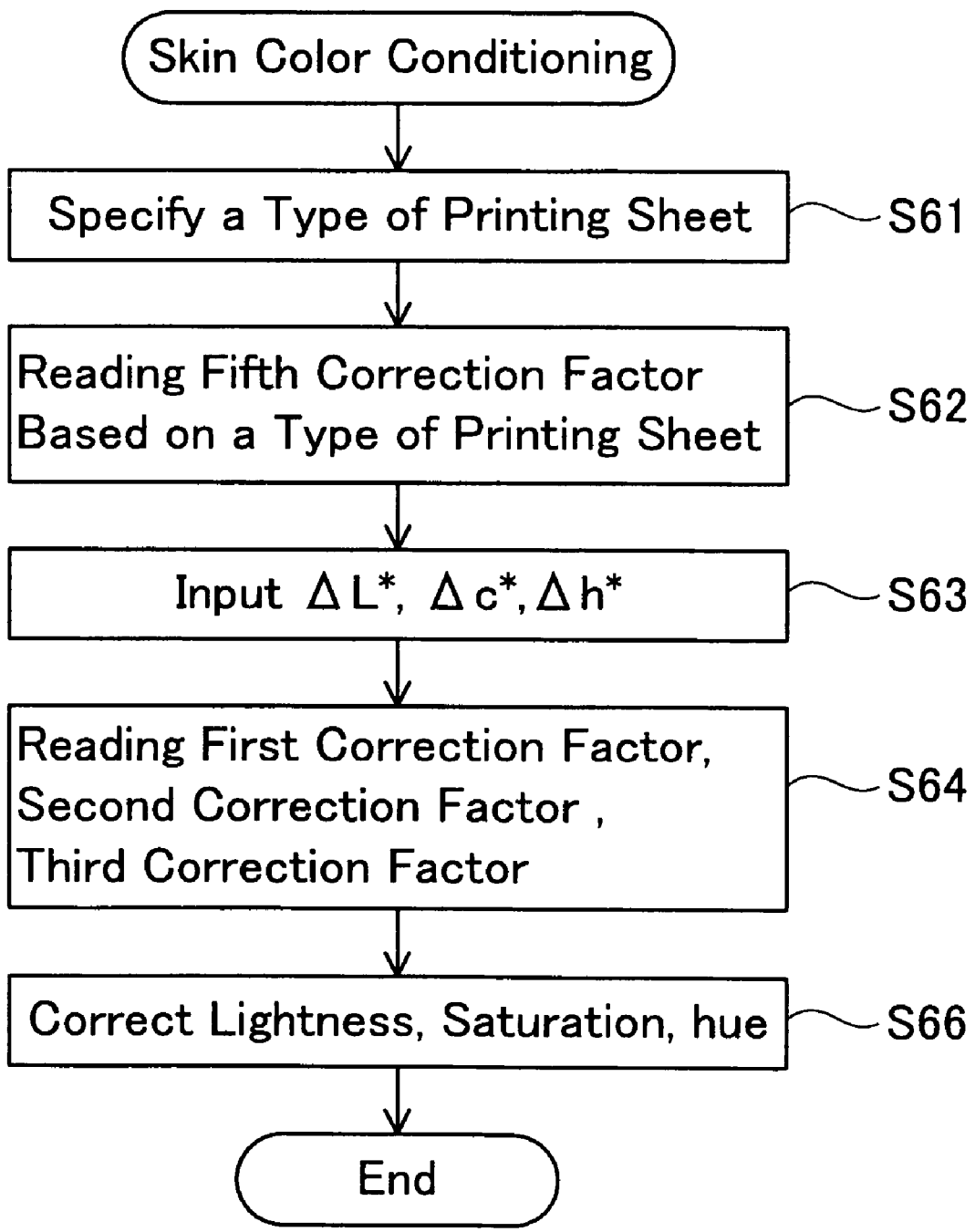
FIG. 15 shows a correction process sequence of the fifth embodiment.

FIG. 15 shows the process sequence of correcting skin color in accordance with the selected printing sheet. First, the user inputs the selected type of printing sheet (S61). Next, the fifth correction factor is found by referring to the fifth correction factor curve 4*d* stored in the ROM 4 (S62). The fifth correction factor which corresponds to the selected printing sheet is selected. Next, the user inputs the lightness value modulation amount, the saturation value modulation amount, and the hue value modulation amount (S63). Then the first correction factor, the second correction factor, and the third correction factor are found by referring to the first to third correction factor curves 4*b* stored in the ROM 64 (S64). Next, the corrected lightness, corrected saturation, and corrected hue are found by referring to the formulas 9, 10, and 11 (S66).

A sixth embodiment of the present invention will be described. The sixth embodiment is an adaptation of the fourth embodiment or the fifth embodiment. Descriptions will only be provided for components that differ from those in the fourth embodiment or the fifth embodiment, and descriptions for components that are identical to those in the fourth embodiment or the fifth embodiment will be omitted.

In the fourth embodiment, the fourth correction factor was set, and the corrected lightness, corrected saturation, and corrected hue were determined so as to prevent the primary colors from being corrected. A fourth correction factor could be stored in the ROM 4 for each of the printing sheets. However, it is possible to utilize the fifth correction factor used in the fifth embodiment even if the fourth correction factor is not stored for each of the printing sheets.

When performing image correction corresponding to the selected type of printing sheet such that the primary colors are prevented from being corrected, corrected lightness, corrected saturation, and corrected hue can be determined utilizing the formula below.

If lightness prior to correction is L* and the corrected lightness is L*', correction in the sixth embodiment is performed using the following formula.

$$L^{*\prime}=L^{*}+\Delta L^{*}\times F(L^{*})\times F(c^{*})\times F(h^{*})\times F(c^{*}h^{*})\times F(x) \quad \text{Formula 10.}$$

Above, $\Delta L^{*}$ represents the lightness value modulation amount set by the user, F (L*) represents the first correction factor, F (c*) represents the second correction factor, F (h*) represents the third correction factor, F (c*h*) represents the fourth correction factor, and F (x) represents the fifth correction factor.

Similarly, if saturation prior to correction is c* and the corrected saturation is c*', correction in the sixth embodiment is performed using the following formula.

$$c^{*\prime}=c^{*}+\Delta c^{*}\times F(L^{*})\times F(c^{*})\times F(h^{*})\times F(c^{*}h^{*})\times F(x) \quad \text{Formula 11.}$$

Above, $\Delta c^{*}$ represents the saturation value modulation amount set by the user.

Similarly, if the hue prior to correction is h* and the corrected hue is h*', correction in the sixth embodiment is performed using the following formula.

$$h^{*\prime}=h^{*}+\Delta h^{*}\times F(L^{*})\times F(c^{*})\times F(h^{*})\times F(c^{*}h^{*})\times F(x) \quad \text{Formula 12.}$$

Above, $\Delta h^{*}$ represents the hue value modulation amount set by the user.

The present invention has been described based on the above embodiments. However, the present invention is not limited to the embodiments described above. Transformations and modifications of the present invention are possible without deviating from the aims of the present invention.

For example, in the first embodiment and the third to sixth embodiments, the RGB image information input from the external media was first converted into the XYZ values by performing the ICC sRGB profile conversion, then was converted by means of computation from the XYZ values into the L*, a*, b* values, and then was converted by means of computation from the L*, a*, b* values into the L*, c*, h* values. However, the RGB values may be directly converted into the L*, c*, h* values by referring to a look-up table, or the like, as in the second embodiment.

Further, in the case where, for example, the corrected lightness value L*', the corrected saturation value c*', and the corrected hue value h*' are converted into the R'G'B' values, these may be directly converted into the R'G'B' values by referring to a look-up table.

In the above embodiments, the correction process of the specified color was performed in the printer 1. However, the correction process of the specified color may be performed in the PC 20, and the color image information (R'G'B') on which the correction process has been performed or the combination of the component values of the colors of ink used in printing (the CMYK values) may be transmitted to the printer 1.

In the above embodiments, the first correction factor, the second correction factor, and the third correction factor have been described for a situation where the specified color is skin color. However, the specified color need not be skin color. Even if the specified color is not skin color, the color of the primary colors will not be corrected if the fourth correction factor is utilized. Further, even if the specified color is not skin color, utilizing the fifth correction factor makes it possible to perform printing with a color gamut that corresponds to the type of printing sheet.

In the above embodiments, the look-up table for converting the RGB values into the R'G'B' values is created on the basis of the inputted modulation amounts $\Delta L^{*}$, $\Delta c^{*}$, and $\Delta h^{*}$, and the RGB values are converted into the direct R'G'B' values utilizing this look-up table. However, with respect to printer 1, a look-up table for directly converting the RGB values into the CMYK values in which the specified color has been corrected may be created, and the RGB values may be converted into the direct CMYK values.

Further, a look-up table may be created to correspond to the type of printing sheet or the type of ink, and the RGB values may be converted into the direct R'G'B' values in correspondence with the type of printing sheet or the type of ink, or the RGB values may be converted into the direct CMYK values in correspondence with the type of printing sheet or the type of ink.

Further, in the above embodiments, the user inputs the modulation amounts $\Delta L^{*}$, $\Delta c^{*}$, and $\Delta h^{*}$, and then the specified color is corrected on the basis of these modulation amounts. However, the manufacturer of the printer 1 may set a plurality of modulation amounts at the time of manufacture, and the user may select from among this plurality of modulation amounts.

In the above embodiments, the user performs a selection setting to correspond to the type of printing sheet placed in the paper supply apparatus. However, the paper supply apparatus may also be provided with a function for detecting the type of printing sheet. Further, the printing process may be performed to correspond to the type of printing sheet that has been recognized by this function.

In the fifth embodiment, the ROM 4 stores the fifth correction factor which corresponds to the type of printing sheet. However, correspondences for the combination of type of printing sheet and type of ink may equally well be stored in the fifth correction factor.

In the third embodiment, a Gaussian function was used as the approximating function. However, any type of known function for approximating data may also be utilized, such as a trigonometric function and a polynomial function.

What is claimed is:

1. A processing apparatus for color image information, comprising:
an input device configured to input a combination of component values of reference colors that constitute a processing color;
a conversion device configured to convert the inputted combination of component values of reference colors into a lightness value, saturation value, and hue value;
a storage device configured to store a first correction factor dependent on a lightness value, wherein the first correction factor has a value of 1.0 for a lightness value converted from a specified color, and monotonically decreases toward 0.0 as the lightness value deviates from the lightness value converted from the specified color, and has a value greater than 0.0 when the lightness value is maximum;

a storage device configured to store a second correction factor dependent on a saturation value, wherein the second correction factor has a value of 1.0 for a saturation value converted from the specified color, and monotonically decreases toward 0.0 as the saturation value deviates from the saturation value converted from the specified color;

a storage device configured to store a third correction factor dependent on a hue value, wherein the third correction factor has a value of 1.0 for a hue value converted from the specified color, and monotonically decreases toward 0.0 as the hue value deviates from the hue value converted from the specified color;

a modulation amount storage device configured to store a modulation amount of a lightness value, modulation amount of a saturation value, and modulation amount of a hue value;

a lightness correction device configured to compute a corrected lightness value of the processing color by adding a multiplied value to the converted lightness value of the processing color prior to correction, wherein the multiplied value is a product of the modulation amount of a lightness value, the first correction factor corresponding to the converted lightness value of the processing color prior to correction, the second correction factor corresponding to the converted saturation value of the processing color prior to correction, and the third correction factor corresponding to the converted hue value of the processing color prior to correction;

a saturation correction device configured to compute a corrected saturation value of the processing color by adding a multiplied value to the converted saturation value of the processing color prior to correction, wherein the multiplied value is a product of the modulation amount of a saturation value, the first correction factor corresponding to the converted lightness value of the processing color prior to correction, the second correction factor corresponding to the converted saturation value of the processing color prior to correction, and the third correction factor corresponding to the converted hue value of the processing color prior to correction;

a hue correction device configured to compute a corrected hue value of the processing color by adding a multiplied value to the converted hue value of the processing color prior to correction, wherein the multiplied value is a product of the modulation amount of a hue value, the first correction factor corresponding to the converted lightness value of the processing color prior to correction, the second correction factor corresponding to the converted saturation value of the processing color prior to correction, and the third correction factor corresponding to the converted hue value of the processing color prior to correction; and an inverse conversion device configured to inversely convert the corrected lightness value, corrected saturation value, and corrected hue value into a combination of component values of reference colors constituting the corrected processing color.

2. The processing apparatus of claim 1, wherein the specified color is skin color.

3. The processing apparatus of claim 1, wherein the color image is a color photograph of a face of a person, or faces of people.

4. The processing apparatus of claim 1, wherein:

the first correction factor is 1.0 within a predetermined range which includes the lightness value converted from the specified color, and monotonically decreases along a sine or cosine wave outside the predetermined range;

the second correction factor is 1.0 within a predetermined range which includes the saturation value converted from the specified color, and monotonically decreases along a sine or cosine wave outside the predetermined range; and the third correction factor is 1.0 within a predetermined range which includes the hue value converted from the specified color, and monotonically decreases along a sine or cosine wave outside the predetermined range.

5. The processing apparatus of claim 1, wherein:

the input device inputs the combination of component values of reference colors that constitute a color for each pixel, these pixels constituting a predetermined area of the color image; and the processing apparatus further comprises:

a lightness histogram creation device configured to compute pixel counts for different lightness levels from a plurality of pixels that constitute the predetermined area;

a first correction factor curve computing device configured to approximate the lightness histogram under the condition that the maximum value is 1.0 and the minimum value is 0.0;

a saturation histogram creation device configured to compute pixel counts for different saturation levels from the plurality of pixels that constitute the predetermined area;

a second correction factor curve computing device configured to approximate the saturation histogram under the condition that the maximum value is 1.0 and the minimum value is 0.0;

a hue histogram creation device configured to compute pixel counts for different hue levels from the plurality of pixels that constitute the predetermined area; and a third correction factor curve computing device configured to approximate the hue histogram under the condition that the maximum value is 1.0 and the minimum value is 0.0, wherein:

the storage device configured to store the first correction factor stores values on the curve computed by the first correction factor curve computing device as the first correction factor;

the storage device configured to store the second correction factor stores values on the curve computed by the second correction factor curve computing device as the second correction factor; and the storage device configured to store the third correction factor stores values on the curve computed by the third correction factor curve computing device as the third correction factor.

6. The processing apparatus of claim 5, wherein:

the first correction factor curve computing device approximates the lightness histogram using a Gaussian function with a maximum value of 1.0 and a minimum value of 0.0;

the second correction factor curve computing device approximates the saturation histogram using a Gaussian function with a maximum value of 1.0 and a minimum value of 0.0; and the third correction factor curve computing device approximates the hue histogram using a Gaussian function with a maximum value of 1.0 and a minimum value of 0.0.

7. The processing apparatus of claim 1, further comprising:

a storage device configured to store a fourth correction factor, wherein the fourth correction factor has a value of 1.0 for each hue within a range spanning from a minimum saturation value for the given hue to a saturation value determined from the given hue, and monotonically decreases from the value at the determined saturation value until the value approaches 0.0 at a maximum saturation value for the given hue; and a fourth correction factor acquisition device configured to read the fourth correction factor from the storage device configured to store the fourth correction factor based on the hue value and saturation value prior to correction of the processing color, wherein the lightness correction device computes the corrected lightness value of the processing color by adding a multiplied value to the converted lightness value of the processing color prior to correction, wherein the multiplied value is a product of the modulation amount of a lightness value, the first correction factor corresponding to the converted lightness value of the processing color prior to correction, the second correction factor corresponding to the converted saturation value of the processing color prior to correction, the third correction factor corresponding to the converted hue value of the processing color prior to correction, and the fourth correction factor which has been read out; wherein the saturation correction device computes the corrected saturation value of the processing color by adding a multiplied value to the converted saturation value of the processing color prior to correction, wherein the multiplied value is a product of the modulation amount of a saturation value, the first correction factor corresponding to the converted lightness value of the processing color prior to correction, the second correction factor corresponding to the converted saturation value of the processing color prior to correction, the third correction factor corresponding to the converted hue value of the processing color prior to correction, and the fourth correction factor which has been read out; and the hue correction device computes the corrected hue value of the processing color by adding a multiplied value to the converted hue value of the processing color prior to correction, wherein the multiplied value is a product of the modulation amount of a hue value, the first correction factor corresponding to the converted lightness value of the processing color prior to correction, the second correction factor corresponding to the converted saturation value of the processing color prior to correction, the third correction factor corresponding to the converted hue value of the processing color prior to correction, and the fourth correction factor which has been read out.

8. The processing apparatus of claim 7, wherein the fourth correction factor from the determined saturation value to the maximum saturation value is along a sine curve.

9. The processing apparatus of claim 1, further comprising:

a display device configured to display colors composed by combining component values of reference colors inversely converted by the inverse conversion device.

10. The processing apparatus of claim 1, further comprising:

a printing device configured to print colors composed by combining component values of reference colors inversely converted by the inverse conversion device.

11. The processing apparatus of claim 10, further comprising:

a type specifying device configured to specify a type of printing sheet;

a storage device configured to store a fifth correction factor, wherein the fifth correction factor is determined for each type of printing sheet; and a fifth correction factor acquisition device configured to read the fifth correction factor from the storage device configured to store the fifth correction factor based on a type of specified printing sheet, wherein:

the lightness correction device computes the corrected lightness value of the processing color by adding a multiplied value to the converted lightness value of the processing color prior to correction, wherein the multiplied value is a product of the modulation amount of a lightness value, the first correction factor corresponding to the converted lightness value of the processing color prior to correction, the second correction factor corresponding to the converted saturation value of the processing color prior to correction, the third correction factor corresponding to the converted hue value of the processing color prior to correction, and the fifth correction factor;

the saturation correction device computes the corrected saturation value of the processing color by adding a multiplied value to the converted saturation value of the processing color prior to correction, wherein the multiplied value is a product of the modulation amount of a saturation value, the first correction factor corresponding to the converted lightness value of the processing color prior to correction, the second correction factor corresponding to the converted saturation value of the processing color prior to correction, the third correction factor corresponding to the converted hue value of the processing color prior to correction, and the fifth correction factor; and the hue correction device computes the corrected hue value of the processing color by adding a multiplied value to the converted hue value of the processing color prior to correction, wherein the multiplied value is a product of the modulation amount of a hue value, the first correction factor corresponding to the converted lightness value of the processing color prior to correction, the second correction factor corresponding to the converted saturation value of the processing color prior to correction, the third correction factor corresponding to the converted hue value of the processing color prior to correction, and the fifth correction factor.

12. The processing apparatus of claim 11, wherein the fifth correction factor corresponding to the type of printing sheet is a ratio between a volume of a color space of a color gamut printable on a standard type printing sheet and a volume of a color space of a color gamut printable on the corresponding type of printing sheet.

13. The processing apparatus of claim 1, further comprising:

a storage device configured to store a fourth correction factor, wherein the fourth correction factor has a value of 1.0 for each hue within a range spanning from a minimum saturation value for the given hue to a saturation value determined from the given hue, and monotonically decreases from the saturation value toward a maximum saturation value for the given hue;

a fourth correction factor acquisition device configured to read the fourth correction factor from the storage device configured to store the fourth correction factor based on the hue value and saturation value prior to correction of the processing color;

a printing device configured to print colors composed by combining component values of reference colors inversely converted by the inverse conversion device;

a type specifying device configured to specify a type of printing sheet; correction, the fourth correction factor which has been read out and the fifth correction factor.

14. A processing method of color image information, comprising:

inputting, using an input device, a combination of component values of reference colors that constitute a processing color;

converting, using a conversion device, the inputted combination of component values of reference colors into a lightness value, saturation value, and hue value;

storing a modulation amount of a lightness value, modulation amount of a saturation value, and modulation amount of a hue value;

computing, using a computing device, a corrected lightness value of the processing color by adding a multiplied value to the converted lightness value of the processing color prior to correction, wherein the multiplied value is a product of the modulation amount of a lightness value, the first correction factor corresponding to the converted lightness value of the processing color prior to correction, the second correction factor corresponding to the converted saturation value of the processing color prior to correction, and the third correction factor corresponding to the converted hue value of the processing color prior to correction, wherein:

the first correction factor has a value of 1.0 for a lightness value converted from a specified color, and monotonically decreases toward 0.0 as the lightness value deviates from the lightness value converted from the specified color, and has a value greater than 0.0 when the lightness value is maximum;

the second correction factor has a value of 1.0 for a saturation value converted from the specified color, and monotonically decreases toward 0.0 as the saturation value deviates from the saturation value converted from the specified color; and the third correction factor has a value of 1.0 for a hue value converted from the specified color, and monotonically decreases toward 0.0 as the hue value deviates from the hue value converted from the specified color;

computing, using the computing device, a corrected saturation value of the processing color by adding a multiplied value to the converted saturation value of the processing color prior to correction, wherein the multiplied value is a product of the modulation amount of a saturation value, the first correction factor corresponding to the converted lightness value of the processing color prior to correction, the second correction factor corresponding to the converted saturation value of the processing color prior to correction, and the third correction factor corresponding to the converted hue value of the processing color prior to correction;

computing, using the computing device, a corrected hue value the processing color by adding a multiplied value to the converted hue value of the processing color prior to correction, wherein the multiplied value is a product of the modulation amount of a hue value, the first correction factor corresponding to the converted lightness value of the processing color prior to correction, the second correction factor corresponding to the converted saturation value of the processing color prior to correction, and the third correction factor corresponding to the converted hue value of the processing color prior to correction; and inversely converting the corrected lightness value, corrected saturation value, and corrected hue value into a combination of component values of reference colors that constitute the corrected color.

15. A computer-readable medium having stored thereon a first correction factor dependent on a lightness value, wherein the first correction factor has a value of 1.0 for a lightness value converted from a specified color, and monotonically decreases toward 0.0 as the lightness value deviates from the lightness value converted from the specified color, and has a value greater than 0.0 when the lightness value is maximum;

a second correction factor dependent on a saturation value, wherein the second correction factor has a value of 1.0 for a saturation value converted from the specified color, and monotonically decreases toward 0.0 as the first correction factor deviates from the converted saturation value; and a third correction factor dependent on a hue value, wherein the third correction factor has a value of 1.0 for a hue value converted from the specified color, and monotonically decreases toward 0.0 as the hue value deviates from the hue value converted from the specified color, and having computer readable instructions stored thereon for execution by a processor to perform a method comprising:

inputting a combination of component values of reference colors that constitute a processing color;

converting the inputted combination of component values of reference colors into a lightness value, saturation value, and hue value;

storing a modulation amount of a lightness value, modulation amount of a saturation value, and modulation amount of a hue value;

computing a corrected lightness value of the processing color by adding a multiplied value to the converted lightness value of the processing color prior to correction, wherein the multiplied value is a product of the modulation amount of a lightness value, the first correction factor corresponding to the converted lightness value of the processing color prior to correction, the second correction factor corresponding to the converted saturation value of the processing color prior to correction, and the third correction factor corresponding to the converted hue value of the processing color prior to correction, computing a corrected saturation value of the processing color by adding a multiplied value to the converted saturation value of the processing color prior to correction, wherein the multiplied value is a product of the modulation amount of a saturation value, the first correction factor corresponding to the converted lightness value of the processing color prior to correction, the second correction factor corresponding to the converted saturation value of the processing color prior to correction, and the third correction factor corresponding to the converted hue value of the processing color prior to correction;

computing a corrected saturation value of the processing color by adding a multiplied value to the converted hue value of the processing color prior to correction, wherein the multiplied value is a product of the modulation amount of a hue value, the first correction factor corresponding to the converted lightness value of the processing color prior to correction, the second correction factor corresponding to the a storage device configured to store a fifth correction factor, wherein the fifth correction factor is determined for each type of printing sheet; and a fifth correction factor acquisition device configured to read the fifth correction factor from the storage device configured to store the fifth correction factor based on the type of specified printing sheet, wherein:

the lightness correction device computes the corrected lightness value of the processing color by adding a multiplied value to the converted lightness value of the processing color prior to correction, wherein the multiplied value is a product of the modulation amount of a lightness value, the first correction factor corresponding to the converted lightness value of the processing color prior to correction, the second correction factor corresponding to the converted saturation value of the processing color prior to correction, the third correction factor corresponding to the converted hue value of the processing color prior to correction, the fourth correction factor which has been read out and the fifth correction factor;

the saturation correction device computes the corrected saturation value of the processing color by adding a multiplied value to the converted saturation value of the processing color prior to correction, wherein the multiplied value is a product of the modulation amount of a saturation value, the first correction factor corresponding to the converted lightness value of the processing color prior to correction, the second correction factor corresponding to the converted saturation value of the processing color prior to correction, the third correction factor corresponding to the converted hue value of the processing color prior to correction, the fourth correction factor which has been read out and the fifth correction factor; and the hue correction device computes the corrected hue value of the processing color by adding a multiplied value to the converted hue value of the processing color prior to correction, wherein the multiplied value is a product of the modulation amount of a hue value, the first correction factor corresponding to the converted lightness value of the processing color prior to correction, the second correction factor corresponding to the converted saturation value of the processing color prior to correction, the third correction factor corresponding to the converted hue value of the processing color prior to converted saturation value of the processing color prior to correction, and the third correction factor corresponding to the converted hue value of the processing color prior to correction; and inversely converting the corrected lightness value, corrected saturation value, and corrected hue value into a combination of component values of reference colors that constitute the corrected color.

16. The processing apparatus of claim 5, further comprising:

a storage device configured to store a plurality of the curves computed by the first correction factor curve computing device as the first correction factor, a plurality of the curves computed by the second correction factor curve computing device as the second correction factor and a plurality of the curves computed by the third correction factor curve computing device as the third correction factor; and a select device configured to select one of the curves computed by the first correction factor curve computing device as the first correction factor, one of the curves computed by the second correction factor curve computing device as the second correction factor and one of the curves computed by the third correction factor curve computing device as the third correction factor.

* * * * *